United States Patent
Zhai et al.

(10) Patent No.: US 8,612,213 B1
(45) Date of Patent: Dec. 17, 2013

(54) CORRECTION OF ERRORS IN CHARACTER STRINGS THAT INCLUDE A WORD DELIMITER

(71) Applicant: Google Inc., Mountain View, CA (US)

(72) Inventors: Shumin Zhai, Los Altos, CA (US); Kurt Edward Partridge, Palo Alto, CA (US); Yu Ouyang, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/901,259

(22) Filed: May 23, 2013

Related U.S. Application Data

(60) Provisional application No. 61/714,627, filed on Oct. 16, 2012.

(51) Int. Cl.
*G06F 17/27* (2006.01)

(52) U.S. Cl.
USPC .............................. 704/9; 704/257; 704/251

(58) Field of Classification Search
USPC ............... 704/1–10, 251, 255, 257, 270, 272, 704/270.1
See application file for complete search history.

(56) References Cited

U.S. PATENT DOCUMENTS

| | | | |
|---|---|---|---|
| 4,703,425 A | 10/1987 | Muraki | |
| 4,859,091 A | 8/1989 | Ueda | |
| 4,873,634 A | 10/1989 | Frisch et al. | |
| 5,761,689 A | 6/1998 | Rayson et al. | |
| 5,802,205 A | 9/1998 | Emico et al. | |
| 5,940,847 A | 8/1999 | Fein et al. | |
| 6,047,300 A | 4/2000 | Walfish et al. | |
| 6,292,179 B1 | 9/2001 | Lee | |
| 6,618,697 B1 | 9/2003 | Kantrowitz et al. | |
| 6,801,190 B1 | 10/2004 | Robinson et al. | |
| 7,030,863 B2 | 4/2006 | Longe et al. | |
| 7,042,443 B2 | 5/2006 | Woodard et al. | |
| 7,088,345 B2 | 8/2006 | Robinson et al. | |
| 7,145,554 B2 | 12/2006 | Bachmann | |
| 7,151,530 B2 | 12/2006 | Roeber et al. | |
| 7,199,786 B2 | 4/2007 | Suraqui | |
| 7,250,938 B2* | 7/2007 | Kirkland et al. | 345/168 |
| 7,251,367 B2 | 7/2007 | Zhai | |
| 7,277,088 B2 | 10/2007 | Robinson et al. | |
| 7,508,324 B2 | 3/2009 | Suraqui | |

(Continued)

OTHER PUBLICATIONS

U.S. Appl. No. 60/430,338, by Daniel Suraqui, filed Nov. 29, 2002.

(Continued)

*Primary Examiner* — Huyen X. Vo
(74) *Attorney, Agent, or Firm* — Shumaker & Sieffert, P.A.

(57) ABSTRACT

In response to determining that a first series of user inputs corresponds to a first character string, the computing device outputs, for display at a display device, the first character string. In response to determining that the first character string does not match a word in a lexicon and in response to determining that the first character string ends with a word delimiter, the computing device replaces the first character string with a second character string. After receiving the first series of user inputs, the computing device receives a second series of user inputs. In response to determining that the second series of user inputs corresponds to a third character string, the computing device outputs the third character string. The computing device determines, based at least in part on the first and second series of user inputs, a fourth character string and outputs, for display, the fourth character string.

20 Claims, 11 Drawing Sheets

(56) References Cited

U.S. PATENT DOCUMENTS

| | | |
|---|---|---|
| 7,602,382 B2 | 10/2009 | Hinckley et al. |
| 7,680,649 B2 | 3/2010 | Park |
| 7,706,616 B2 | 4/2010 | Kristensson et al. |
| 7,716,579 B2 | 5/2010 | Gunn et al. |
| 7,853,874 B2 * | 12/2010 | Schabes et al. ............... 715/257 |
| 7,921,361 B2 | 4/2011 | Gunn et al. |
| 8,036,878 B2 | 10/2011 | Assadollahi |
| 8,078,978 B2 * | 12/2011 | Perry et al. ................... 715/752 |
| 8,135,582 B2 | 3/2012 | Suraqui |
| 8,176,419 B2 | 5/2012 | Zhu et al. |
| 8,179,370 B1 | 5/2012 | Yamasani et al. |
| 8,232,973 B2 | 7/2012 | Kocienda et al. |
| 8,234,106 B2 | 7/2012 | Marcu et al. |
| 8,239,570 B2 | 8/2012 | Beeston et al. |
| 2005/0091033 A1 | 4/2005 | Valdes et al. |
| 2006/0075044 A1 | 4/2006 | Fox et al. |
| 2006/0119582 A1 | 6/2006 | Ng et al. |
| 2006/0176283 A1 | 8/2006 | Suraqui |
| 2006/0241944 A1 | 10/2006 | Potter et al. |
| 2007/0213983 A1 | 9/2007 | Ramsey |
| 2008/0114721 A1 | 5/2008 | Jones et al. |
| 2008/0182599 A1 | 7/2008 | Rainisto et al. |
| 2008/0316183 A1 | 12/2008 | Westerman et al. |
| 2009/0292700 A1 | 11/2009 | Castellani et al. |
| 2009/0307584 A1 | 12/2009 | Davidson et al. |
| 2010/0070908 A1 | 3/2010 | Mori et al. |
| 2010/0106724 A1 | 4/2010 | Anderson |
| 2010/0287486 A1 | 11/2010 | Coddington |
| 2011/0022952 A1 | 1/2011 | Wu et al. |
| 2011/0099506 A1 | 4/2011 | Gargi et al. |
| 2011/0161829 A1 * | 6/2011 | Kristensen ................... 715/739 |
| 2011/0179353 A1 | 7/2011 | Wood |
| 2011/0202836 A1 | 8/2011 | Badger et al. |
| 2012/0036469 A1 | 2/2012 | Suraqui |
| 2012/0078616 A1 | 3/2012 | White et al. |
| 2012/0130706 A1 | 5/2012 | Qiu et al. |
| 2012/0290950 A1 | 11/2012 | Rapaport et al. |

OTHER PUBLICATIONS

U.S. Appl. No. 60/505,724, by Daniel Suraqui, filed Sep. 22, 2003.

Lomas, "Hey Apple, What the Next iPhone Really, Really Needs Is a Much Better Keyboard", Techcrunch [online], Apr. 21, 2013. Retrieved from the Internet: <http://techcrunch.com/2013/04/21/the-iphone-keyboard-stinks/?> 6 pgs.

Burns, "Nuance Supercharges Swype, Adds New Keyboard Options, XT9 Predictive Text, and Drangon-Powered Voice Input," Retrieved from http://techcrunch.com/2012/06/20/nuance-supercharges-swype-adds-new-keyboard-options-xt9-predictive-text-and-dragon-powered-voice-input/?, Jun. 21, 2012, 2 pp.

Butcher, "Swiftkey Counters Swype With a Smarter Version, Makes an In-Road Into Healthcare Market," Retrieved from http://techcrunch.com/2012/06/21/swiftkey-counters-swype-with-a-smarter-version-makes-an-in-road-into-healthcare-market/, Jun. 21, 2012, 2 pp.

Young et al., "Token Passing: a Simple Conceptual Model for Connected Speech Recognitions Systems," Cambridge University Engineering Department, Jul. 31, 1989, 23 pp.

* cited by examiner

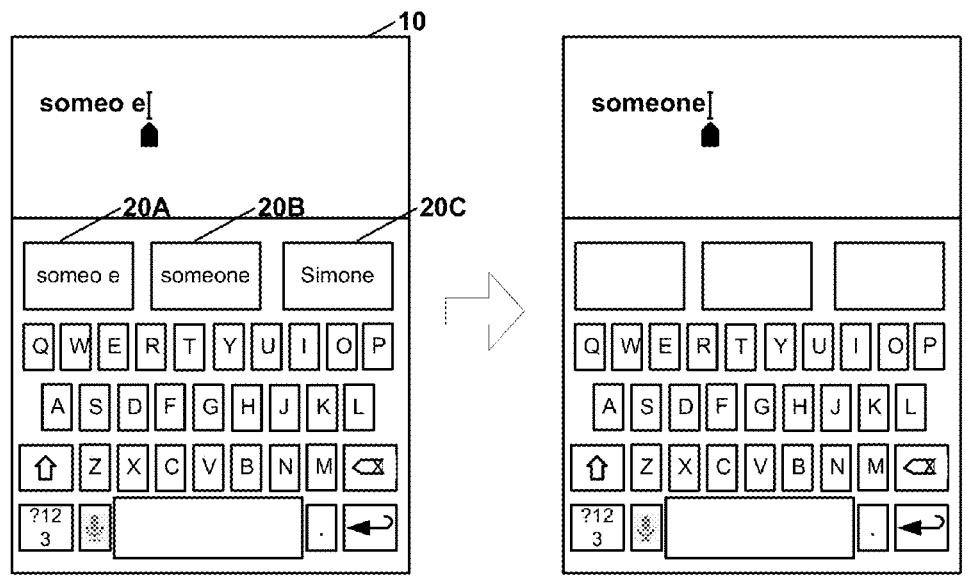
FIG. 6A  FIG. 6B

CORRECTION OF ERRORS IN CHARACTER STRINGS THAT INCLUDE A WORD DELIMITER

This application claims the benefit of U.S. Provisional Patent Application No. 61/714,627, filed Oct. 16, 2012, the entire content of which is incorporated herein by reference.

BACKGROUND

Some computing devices (e.g., mobile phones, tablet computers, etc.) may provide a graphical keyboard as part of a graphical user interface for composing text (e.g., using a presence-sensitive input device and/or display, such as a touchscreen). The graphical keyboard may enable a user of the computing device to enter text (e.g., an e-mail, a text message, or a document, etc.). For instance, a presence-sensitive display of a computing device may output a graphical (or "soft") keyboard that enables the user to enter data by indicating (e.g., by tapping) keys displayed at the presence-sensitive display.

In some cases, the computing device may present a continuous-gesture graphical keyboard (sometimes referred to as a "gesture keyboard" or "combo gesture keyboard") with which a user can interact by sliding his or her finger over regions of the presence-sensitive display that are associated with keys of the graphical keyboard, thereby essentially gesturing a word to be input to the computing device. In other words, the user may input an entire word in a single gesture by tracing over the letters of the word output at a presence-sensitive display. In this way, continuous-gesture graphical keyboards provide an input method that allows the user to enter a word or group of words with a gesture. As such, a continuous-gesture graphical keyboard may allow the user to achieve a certain degree of efficiency, especially compared to one-handed tapping of a presence-sensitive screen (e.g., a presence-sensitive screen operatively coupled to or integrated with a computing device).

Users frequently make typographical errors when entering text into computing devices. The frequency with which users make typographical errors may be especially high on small virtual keyboards, such as those commonly found in mobile telephones and tablets. To help users enter text with fewer typographical errors, a computing device may determine that an entered word is not in a lexicon for a language and may attempt to identify a word that the user meant to enter. The computing device may then automatically replace the entered word with the identified word.

One common type of typographical error involves typing the space character at the wrong place in a phrase. For example, when the user is typing the phrase "this is," the user may enter the space character too early, resulting in the user entering the following sequence of characters "thi sis." In this example, the computing device may determine that the space character is a hard commit of the characters occurring before the space character. The computing device may consider any user input (e.g., tapping gestures) received after the user input of the space character to relate to the next word. Thus, in this example, the computing device does not modify the characters occurring before the space character based on user input received after the user input for the space character.

Furthermore, in the present example, the computing device may determine that "thi" is not in the lexicon and may therefore automatically replace "thi" with a character string that is in the lexicon, such as "this." As a result, the computing device may output the phrase "this sis," which is not the desired phrase. As a result, in this example, the user may have to manually correct either or both the character string "this" and the character string "sis" in order to obtain the desired character string "this is." Such manual correction may slow the user's entry of text, reducing productivity and causing user frustration.

Another problem may occur in instances where a user enters a character string so quickly that the user does not notice that a typographic error has occurred in the character string until the user has also entered the space character. In such instances, after the computing device has received input indicating selection of the space character, the computing device may discard suggestions for the character string. Also in such instances, had the user noticed the typographical error prior to the entering the space character, the user may have corrected the typographical error by selecting one of the character string suggestions provided by the computing device. However, because, in this instance, the user has already entered input indicating selection of the space character, the user may have no way to recover and select from among the provided character string suggestions to correct the typographical error. As a result, in such instances the user may be required to reposition the cursor and manually correct the typographical error in the character string in order to enter the desired text into the computing device.

SUMMARY

In one aspect, a method comprises receiving, by a computing device, a first series of one or more user inputs. Furthermore, the method comprises outputting, for display at a display device, a first string of characters based on the first series of one or more user inputs. In addition, the method comprises, in response to determining that the first string does not match a word in a lexicon and that the first string ends with a word delimiter, outputting, by the computing device and for display at the display device, a second string of characters in place of the first string of characters. The method also comprises after receiving the first series of one or more user inputs, receiving, by the computing device, a second series of one or more user inputs. In addition, the method comprises outputting, by the computing device, for display at the display device, a third string of characters based at least in part on the second series of one or more user inputs. The method also comprises determining, by the computing device and based at least in part on the first and second series of one or more user inputs, a fourth string of characters. Furthermore, the method comprises outputting, by the computing device and for display at the display device, the fourth string in place of the second and third strings of characters.

In another aspect, a computing device comprises one or more processors configured to receive a first series of one or more user inputs. The one or more processors are further configured to output, in response to determining that the first series of one or more user inputs corresponds to a first string of characters and for display at the display device, the first string of characters. In addition, the one or more processors are configured to output, in response to determining that the first string does not match a word in a lexicon and in response to determining that the first string ends with a word delimiter, for display at the display device, a second string of characters in place of the first string of characters. The one or more processors are also configured to receive, after receiving the first series of one or more user inputs, a second series of one or more user inputs. Furthermore, the one or more processors are configured to output, in response to determining that the second series of one or more user inputs corresponds to a third string, for display at the display device, the third string. In addition, the one or more processors are configured to determine, based at least in part on the first and second series of one or more user inputs, a fourth string of characters. The one or more processors are also configured to output, for display at the display device, the fourth string of characters in place of the second and third strings.

In another aspect, a computer-readable storage medium stores instructions that, when executed by one or more processors of a computing device, cause the computing device to output, in response to determining that a first series of one or more user inputs corresponds to a first string of characters, for display at a display device, the first string of characters. The instructions also cause the computing device to output, in response to determining that the first string of characters does not match a word in a lexicon and in response to determining that the first string of characters ends with a word delimiter, for display at the display device, a second string of characters in place of the first string of characters. In addition, the instructions cause the computing device to output, in response to determining that a second series of one or more user inputs received after the first series of one or more user inputs corresponds to a third string of characters, for display at the display device, the third string of characters. The instructions also cause the computing device to determine, based at least in part on the first and second series of one or more user inputs, a fourth string of characters. Furthermore, the instructions cause the computing device to output, for display at the display device, the fourth string in place of the second and third strings of characters.

One or more examples are set forth in the accompanying drawings and the description below. Other features, objects, and advantages will be apparent from the description, drawings, and claims.

BRIEF DESCRIPTION OF DRAWINGS

FIGS. 6A and 6B are conceptual diagrams that illustrate the correction of a word that includes an erroneous space character in place of a non-space character, in accordance with one or more aspects of the present disclosure.

DETAILED DESCRIPTION

Typographical errors frequently occur when users enter text into computing devices, especially mobile telephones and tablets. To mitigate typographical errors, a computing device may determine, in response to receiving an indication of user input that corresponds to a space character, whether a character string that precedes the space character matches a word in a lexicon for a language. The lexicon may be at least a subset of valid words in the language. If the character string does not match any word in the lexicon, the computing device may attempt to identify a word that the user meant to enter. The computing device may then automatically output the identified word in place of the entered character string. After the computing device outputs the identified word in place of the entered character string, the computing device may continue receiving indications of user input to enter text. Characters may include symbols, such as letters, logograms, word delimiter characters (e.g., space characters, punctuation marks, etc.), and so on.

In accordance with the techniques of this disclosure, the computing device may determine, based at least in part on both the initial series of user inputs and the subsequent series of user inputs, a replacement candidate. The computing device may replace both the undesired auto-corrected word and a character string that follows the undesired auto-corrected word with the replacement candidate. In this way, the computing device may save the user the effort of going back to correct the undesired auto-corrected word. Thus, the computing device may treat the space character as a soft commit of the character string entered before the space character. This may give the user the ability to easily correct past words.

The computing device may determine that an initial series of user inputs corresponds to a first character string (e.g., "eo") and may auto-replace the first character string with a second character string (e.g., "do"). The computing device may determine that a subsequent series of user inputs corresponds to the third character string (e.g., "happy") and then determine that it is more likely that the initial and subsequent series of user inputs correspond to a fourth character string (e.g., "so happy") than to the concatenation of the second and third character strings (e.g., "do happy"). Accordingly, the computing device may output the fourth character string (e.g., "so happy") as a replacement candidate. If the computing device receives an indication of a user selection of the replacement candidate, the computing device may output, for display, the fourth character string (e.g., "so happy") in place of the second and third character strings (e.g., "do happy").

Figure 1:
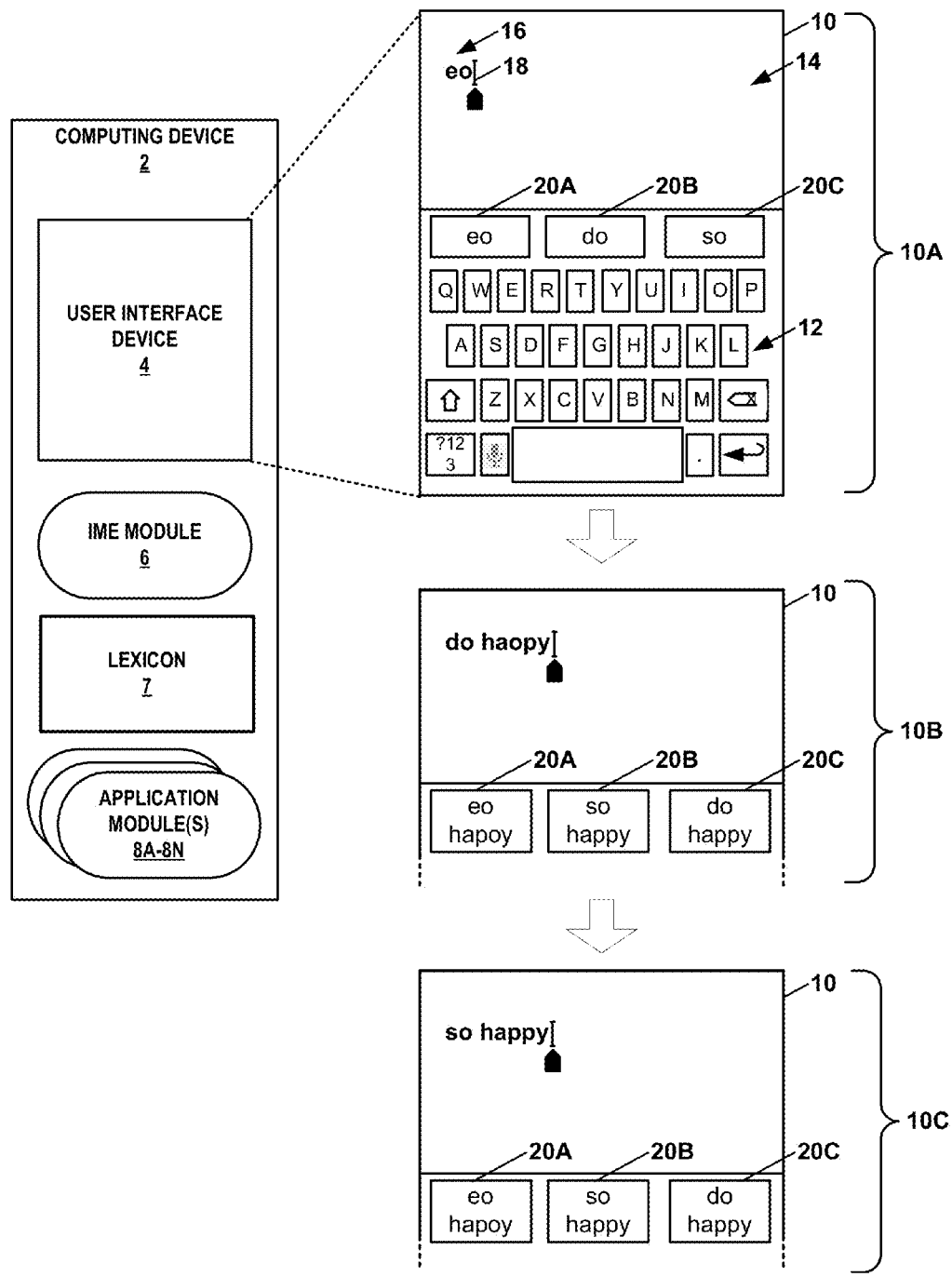
FIG. 1 is a conceptual diagram that illustrates an example computing device in accordance with one or more aspects of the present disclosure.

FIG. 1 is a conceptual diagram that illustrates an example computing device 2 in accordance with one or more techniques of this disclosure. Computing device 2 may be various types of computing devices. For example, computing device 2 may be a mobile device, such as a mobile telephone, a tablet computer, a notebook or laptop computer, a personal media player, a portable gaming device, or another type of computing device. In other examples, computing device 2 may be other types of computing devices, such as desktop computers, point of sale devices, televisions, gambling devices, appliances, in-car computers, and other types of computing devices.

In the example of FIG. 1, computing device 2 includes at least one user interface device 4. User interface device 4 may comprise a display device and a user input device such that user interface device 4 may display graphical data and detect the presence of one or more input objects, such as fingers or styli. Because user interface device 4 may display graphical data and may detect the presence of one or more input objects, user interface device 4 may be referred to as a presence-sensitive display device. User interface device 4 may be implemented using various technologies. For example, user interface device 4 may be implemented using a resistive touchscreen, a surface acoustic wave touchscreen, a capacitive touchscreen, a projective capacitance touchscreen, an acoustic pulse recognition touchscreen, or another touchscreen technology. In some examples, user interface device 4 may be able to detect the presence of an input object without the input object physically touching user interface device 4. Rather, in such examples, user interface device 4 may be able to detect the presence of the input object when the input object is sufficiently close to user interface device 4.

User interface device 4 may be operatively coupled to computing device 2 in various ways. For example, user interface device 4 may be integrated into a housing of computing device 2 and may be connected to computing device 2 via one or more internal connectors. In another example, user interface device 4 may be external to a housing of computing device 2 and may communicate with computing device 2 via one or more external cables and/or communication networks.

Although the example of FIG. 1 assumes that user interface device 4 is a presence-sensitive display device, the techniques of this disclosure are not so limited. In other examples, user interface device 4 may be a display device that does not detect the presence of input objects. For example, computing device 2 may receive indications of user input from a user input device may be output graphical data for display at a display device that is separate from the user input device.

As shown in FIG. 1, computing device 2 may output a graphical user interface (GUI) 10 for display at user interface device 4. The example of FIG. 1 includes three example configurations of GUI 10, labeled 10A, 10B, and 10C. In general, a GUI may be a type of user interface that allows a user to use images to interact with a computing device. GUI 10 may include a virtual keyboard 12. Virtual keyboard 12 may include a set of virtual keys. In addition, GUI 10 may include a text display area 14. Text display area 14 may display text 16 that has been entered by a user. For instance, computing device 2 may output text 16 for display in text display area 14 in response to one or more indications of user input at virtual keyboard 12. In addition, text display area 14 may include a cursor 18 that indicates an insertion point within text 16. Computing device 2 may insert characters at the insertion point or delete characters adjacent to the input point indicated by cursor 18. In addition, GUI 10 may include a set of suggestion elements 20A-20C (collectively, "suggestion elements 20").

Computing device 2 may include an input method editor (IME) module 6. IME module 6 may receive user input events. The user input events may comprise data that indicate user input received by computing device 2. IME module 6 may receive various types of user input events. For example, IME module 6 may receive user input events that indicate presses and releases of keys on a physical keyboard. In another example, IME module 6 may receive user input events that indicate tapping gestures at virtual keys on a virtual (e.g., onscreen) keyboard. In another example, IME module 6 may receive user input events that indicate sliding gestures on a virtual keyboard.

IME module 6 may determine that user input events correspond to strings of one or more characters (i.e., character strings). In various examples, IME module 6 may determine that the user input events correspond to character strings that match words in various languages, such as English, Russian, French, Japanese, Korean, Chinese, Hindi, Arabic, and so on. IME module 6 may implement an incremental multi-word recognition algorithm. That is, IME module 6 may determine one or more hypothesized character strings correspond to the user input events in response to receiving each of the user input events.

In the example of FIG. 1, computing device 2 also includes application module(s) 8A-8N (collectively, "application module(s) 8"). Execution of instructions in application module(s) 8 may cause computing device 2 to provide various applications (e.g., "apps"). In some examples, IME module 6 may output the character strings determined by IME module 6 to one or more of application module(s) 8.

Furthermore, when IME module 6 receives a series of one or more user input events that corresponds to a particular character string, IME module 6 may determine a set of replacement candidates based on the series of user input events. The set of replacement candidates may include words in lexicon 7 that have prefixes that match the particular character string. For instance, if the particular character string is "eo," the set of replacement candidates for the character string "eo" may include the words "eon," "Eos," "eolith," "Eocene," and so on. In addition, the set of replacement candidates may include words that the user may have intended to input when the user provided the user inputs indicated by the series of user input events. For example, if the particular character string is "eo," the set of replacement candidates may include the words "do" and "so."

IME module 6 may assign a replacement score to each of the replacement candidates. In general, the replacement score assigned to a replacement candidate may be correlated with an estimated probability that the replacement candidate is the character string that the user wants to input. The remainder of this disclosure assumes that relatively low replacement scores are assigned to replacement candidates that have relatively high probabilities of being the character strings that the user wants to input, and vice versa. However, in other examples, relatively high replacement scores may be assigned to replacement candidates that have relatively high probabilities of being the character strings that the user wants to input.

After IME module 6 determines the set of replacement candidates and their replacement scores, IME module 6 may select a portion (e.g., a subset) of the replacement candidates. In some examples, IME module 6 may select the portion of the replacement candidates based at least in part on the replacement scores for the replacement candidates. In some examples, IME module 6 may select the portion of the replacement candidates based on one or more additional factors, such as whether certain replacement candidates are blacklisted or whitelisted. After selecting the portion of the replacement candidates, IME module 6 may populate the selected replacement candidates into suggestion elements 20. As illustrated in the configuration 10A of GUI 10 in FIG. 1, IME module 6 may populate the replacement candidates "eo," "do" and "so" into suggestion elements 20.

IME module 6 may receive a user input event that corresponds to a user selection of one of suggestion elements 20. In response, IME module 6 may determine a relevant character string for a replacement candidate in the selected suggestion element. The relevant character string may be a string of characters in text 16. IME module 6 may then output, for display, the replacement candidate in the selected suggestion element in place of the relevant character string. For example, if IME module 6 receives a user input event that corresponds to a user selection of suggestion element 20C in configuration 10A of GUI 10, computing device 2 may output the replacement candidate "so" in place of the character string "eo." In some examples, the relevant character string may include the characters of a word adjacent to cursor 18. Furthermore, in some instances, the relevant character string may include one or more words that precede cursor 18.

In many instances, computing device 2 does not receive a user input that corresponds to a user selection of one of suggestion elements 20. Rather, after determining that a series of user input events corresponds to a particular character string, IME module 6 may determine that a subsequent user input event that corresponds to a word delimiter. Example word delimiters may include space characters, period marks, question marks, commas, semi-colons, quotation marks, exclamation marks, return characters, the beginning of the text, and so on. In addition, IME module 6 may determine that a subsequent user input event corresponds to a word delimiter if the subsequent user input event indicates a tapping or sliding gesture to move cursor 18 to a different location within text display area 14.

In response to determining that the subsequent user input event corresponds to a word delimiter, IME module 6 may determine a top-ranked replacement candidate. The top-ranked replacement candidate may be the replacement candidate that has a lowest replacement score. In addition, IME module 6 may determine the relevant character string for the top-ranked replacement character. IME module 6 may then determine whether the relevant character string for the top-ranked character string includes a word that does not match any word in lexicon 7. If the relevant character string for the top-ranked character string includes a word that does not match any word in lexicon 7 and the replacement score for the top-ranked replacement candidate is below an auto-replacement threshold, IME module 6 may automatically output, for display, the top-ranked replacement candidate in place of the relevant character string for the top-ranked candidate. In this way, IME module 6 may automatically replace the relevant character string with the top-ranked replacement candidate when the user inputs a word delimiter, such as a space character. When IME module 6 outputs the top-ranked replacement candidate with the relevant character string, IME module 6 may maintain (e.g., retain) the set of candidate strings. For instance, in the example of FIG. 1, the character string "eo" does not match a word in lexicon 7. Accordingly, as shown in configuration 10B of GUI 10, IME module 6 has automatically replaced the character string "eo" with the top-ranked replacement candidate "do."

Because IME module 6 maintains the set of candidate strings after receiving the user input of the word delimiter, IME module 6 may again output at least a portion of the suggested character strings in suggestion elements 20 if IME module 6 receives an additional user input event to delete the word delimiter. In response to receiving a user input event indicating a selection of one of the suggestion elements, IME module 6 may output a character string indicated by the suggestion element in place of the character string that replaced the original character string.

After IME module 6 outputs the top-ranked replacement candidate in place of the relevant character string, IME module 6 may receive a subsequent, second series of one or more user input events. In response, IME module 6 may determine that the second series of user input events corresponds to another character string. Accordingly, IME module 6 may append the other character string to text 16. Furthermore, IME module 6 may determine, based at least in part on the first series of user input events and the second series of user input events, a second set of replacement candidates.

In some instances, a relevant string for a particular replacement candidate in the second set of replacement candidates may include the other character string and one or more words that precede the other character string in text 16. Thus, if IME module 6 populates this particular replacement candidate into a particular suggestion element and receives a user input event that corresponds to a user selection of the particular suggestion element, IME module 6 may output, for display, the particular replacement candidate in place of the other character string and the one or more words the precede the other character string. IME module 6 may do so even though the preceding words include an auto-replaced word. IME module 6 may provide similar functionality when automatically replacing the particular replacement candidate's relevant character string with the particular replacement candidate.

In the example of FIG. 1, IME module 6 has determined that a second series of user input events corresponds to the character string "haopy" after automatically replacing the character string "eo" with the top-ranked replacement candidate "do." In accordance with the techniques of this disclosure, the correction of the character string "eo" to the character string "do" is not final even after the space character. When the character string "haopy" is entered, IME module 6 may refine its interpretation based on language model information provided by both words (i.e., know that "so happy" is a more likely bi-gram than "do happy"). For instance, IME module 6 may consider joint hypotheses for both character strings (e.g., words) and take into account the frequencies that each character string pair occurs based on a language model. Thus, IME module 6 may maintain a set of candidate strings for a first series of user inputs, e.g., "eo," "do," and "so." IME module 6 may then determine that a set of candidate strings for a series of user inputs following a word delimiter include the character string "haopy" and "happy." The joint hypothesis of "so happy" is more likely than the joint hypotheses "do haopy," "do happy," or "so haopy." Hence, "so happy" may be the top-ranked replacement candidate.

Accordingly, as shown in configuration 10B of GUI 10 in FIG. 1, IME module 6 has populated the replacement candidates "eo hapoy," "so happy," and "do happy" into suggestion elements 20. As shown in configuration 10C of GUI 10 in FIG. 1, IME module 6 has determined that a user input event corresponds to a user selection of suggestion element 20B. In response, IME module 6 has replaced the character string "do haopy" with the character string "so happy." In the example of FIG. 1, virtual keyboard 12 is omitted from configurations 10B and 10C of GUI 10 for clarity.

Thus, in accordance with the techniques of this disclosure, computing device 2 may receive a first series of one or more user inputs. In response to determining that the first series of one or more user inputs corresponds to a first string of characters, computing device 2 may output, for display at the display device, the first string of characters. In response to determining that the first string does not match a word in lexicon 7 and in response to determining that the first string ends with a word delimiter, computing device 2 may output a second string of characters in place of the first string. After receiving the first series of one or more user inputs, computing device 2 may receive a second series of one or more user inputs. In response to determining that the second series of one or more user inputs corresponds to a third string, computing device 2 may output, for display at the display device, the third string. In addition, computing device 2 may determine, based at least in part on the first and second series of user inputs, a fourth string. In some instances, the fourth string may include more than one word in lexicon 7. In other instances, the fourth string may include two or more words in lexicon 7. Computing device 2 may output, for display at the display device, the fourth string in place of the second and third strings.

Figures 4A, 4B:
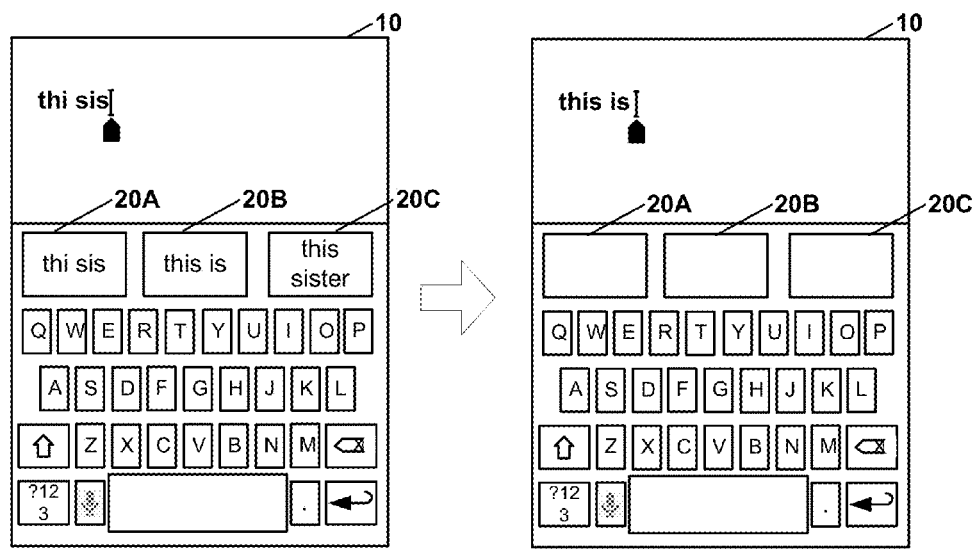
FIGS. 4A and 4B are conceptual diagrams that illustrate the correction of a misplaced space character, in accordance with one or more aspects of the present disclosure.
Figure 7A:
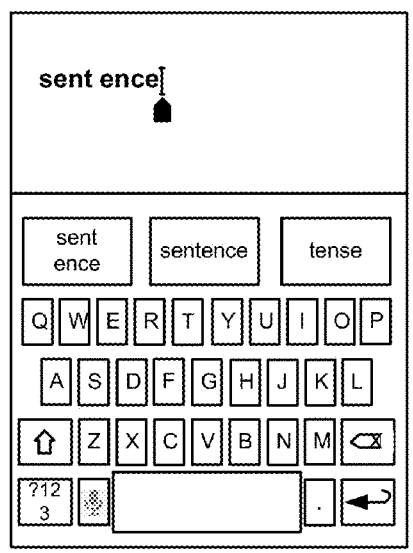
FIGS. 7A and 7B are conceptual diagrams that illustrate the correction of a word that includes an erroneous space character, in accordance with one or more aspects of the present disclosure.
Figure 7B:
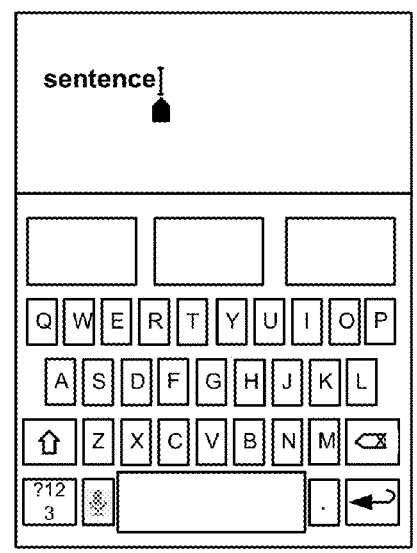

In addition to correcting errors that involve improper auto-replacement of previous words, the techniques of this disclosure may also correct other types of errors that involve word delimiters. For example, IME module 6 may determine replacement candidates that correct errors where a word delimiter (e.g., a space character) was inserted at a wrong point in a character string. FIGS. 4A and 4B, described below, illustrate how IME module 6 may correct such errors. In another example, IME module 6 may determine replacement candidates that correct errors where a word delimiter (e.g., a space character) was inadvertently inserted into the middle of a word. FIGS. 6A and 6B, described below, illustrate how IME module 6 may correct such errors. In another example, IME module 6 may determine replacement candidates that correct errors where a character was inserted into a character string in place of a word delimiter or where a word delimiter was omitted. FIGS. 7A and 7B, described below, illustrate how IME module 6 may correct such errors.

Figure 2:
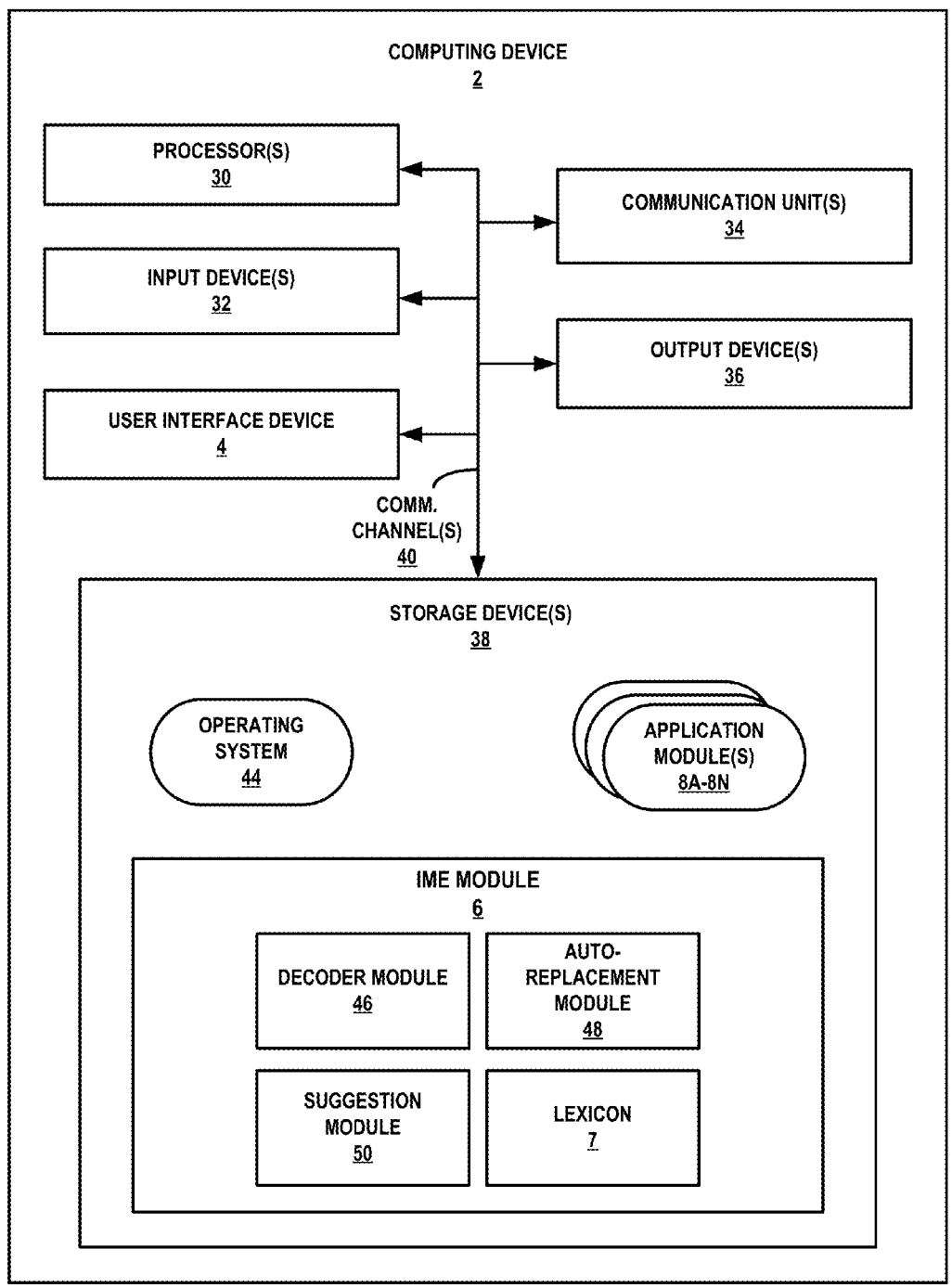
FIG. 2 is a block diagram illustrating an example computing device, in accordance with one or more aspects of the present disclosure.

FIG. 2 is a block diagram that illustrates an example configuration of computing device 2, in accordance with one or more aspects of this disclosure. For purposes of illustration, the discussion of FIG. 2 and the following figures includes continued references to FIG. 1. However, the techniques of this disclosure are not so limited. FIG. 2 illustrates only one particular example of computing device 2, and many other example configurations of computing device 2 exist.

As shown in the example of FIG. 2, computing device 2 includes one or more processors 30, one or more input devices 32, one or more communication units 34, one or more output devices 36, one or more storage devices 38, one or more communication channels 40, and user interface device 4. Computing device 2 may include many other components. For example, computing device 2 may include physical buttons, microphones, speakers, communication ports, and so on.

Communication channels 40 may interconnect each of the components 30, 32, 34, 36, 38, and 4 for inter-component communications (physically, communicatively, and/or operatively). In some examples, communication channel(s) 40 may include a system bus, a network connection, an inter-process communication data structure, or any other method for communicating data.

One or more storage device(s) 38 within computing device 2 may store information required for use during operation of computing device 2. Storage device(s) 38, in some examples, have the primary purpose of being a short term and not a long-term computer-readable storage medium. Storage device(s) 38 may be volatile memory and may therefore not retain stored contents if powered off. Examples of volatile memories may include random access memories (RAM), dynamic random access memories (DRAM), static random access memories (SRAM), and other forms of volatile memories known in the art. Storage devices 38 may further be configured for long-term storage of information as non-volatile memory space and retain information after power on/off cycles. Examples of non-volatile memory configurations may include magnetic hard discs, optical discs, floppy discs, flash memories, or forms of electrically programmable memories (EPROM) or electrically erasable and programmable (EEPROM) memories. In some examples, processor(s) 30 of computing device 2 read and may execute instructions stored by storage device(s) 38.

Computing device 2 may include one or more input device(s) 32 that computing device 2 uses to receive user input. Examples of user input include tactile, audio, and video user input. Input device(s) 32 may include presence-sensitive screens, touch-sensitive screens, mice, keyboards, voice responsive systems, video cameras, microphones or other types of devices for detecting input from a human or machine.

Communication unit(s) 34 may enable computing device 2 to send data on and receive data from a communications network, such as a local area network or the Internet. In some examples, communication unit(s) 34 may include wireless transmitters and receivers that enable computing device 2 to communicate wirelessly with the communications network.

Output device(s) 36 may generate output. Examples of output include tactile, audio, and video output. Output device(s) 36 may include presence-sensitive screens, sound cards, video graphics adapter cards, speakers, cathode ray tube (CRT) monitors, liquid crystal displays (LCD), or other types of devices for generating output.

Processor(s) 30 may read instructions from storage device(s) 38 and may execute instructions stored by storage device(s) 38. Execution of the instructions by processors 30 may configure or cause computing device 2 to provide at least some of the functionality ascribed in this disclosure to computing device 2. As shown in the example of FIG. 2, storage device(s) 38 include computer-readable instructions associated with operating system 44, IME module 6, and application modules 8A-8N. Execution of instructions associated with operating system 44 may cause computing device 2 to perform various functions to manage hardware resources of computing device 2 and to provide various common services for other computer programs. Execution of instructions associated with application modules 8 may cause computing device 2 to provide various applications (e.g., "apps").

In the example of FIG. 2, IME module 6 includes a decoder module 46, an auto-replacement module 48, a suggestion module 50, and lexicon 7. Execution of instructions in these modules may cause computing device 2 to provide the functionality ascribed in this disclosure to these modules.

Decoder module 46 may receive user input events from operating system 44. The user input events may be indications of user inputs received by user interface device 4 and/or input device(s) 32. The user input events may include touch-down events, lift-off events, and movement events. A touch-down event may indicate that user interface device 4 has detected the presence of an input object at a particular location. A lift-off event may indicate that user interface device 4 is no longer able to detect the presence of an input object. A movement event may indicate a movement of an input object on user interface device 4.

Decoder module 46 may determine that a tapping gesture has occurred if a touch-down event occurs for an input object, followed by a lift-off event for the input object without a significant intervening movement event for the input object. Decoder module 46 may determine that a sliding gesture has occurred if a touch-down event occurs for an input object, followed by a movement event for the input object, followed by a lift-off event for the input object. Furthermore, if one of input device(s) 32 is a physical keyboard, the user input events may include key up and key down events that correspond to the pressing and releasing of various keys of the physical keyboard.

Decoder module 46 may determine that a series of one or more user input events corresponds to a string of one or more characters. Decoder module 46 may perform various operations to determine that a series of user input events corresponds to a string of one or more characters. For example, decoder module 46 may determine that a tapping gesture has occurred at a particular location of user interface device 4. In this example, decoder module 46 may determine that the particular location corresponds to a region of user interface device 4 that displays one or more virtual keys. Furthermore, in this example, decoder module 46 may determine, based on various factors, that the user most likely intended to select a particular one of the virtual keys in the region. Such factors may include the particular location on user interface device 4, the preceding characters or words, and so on.

The particular virtual key may correspond to multiple characters. For instance, the particular virtual key may correspond to upper and lower case versions of a character, various accented versions of a character, and so on. In this example, decoder module 46 may then determine, based on another set of factors, a particular character is most likely to correspond to the particular virtual key. This other set of factors may include the preceding characters, preceding words, and so on. In some examples, the particular virtual key may correspond to a word delimiter. In this way, by detecting a series of tapping gestures, decoder module 46 may determine that a series of user input events corresponds to a character string.

In another example, decoder module 46 may determine that a sliding gesture has occurred at user interface device 4. In this example, the sliding gesture may comprise a movement that passes through regions of a virtual keyboard that correspond to particular virtual keys. Decoder module 46 may determine that the sliding gesture most likely corresponds to a particular character string. For example, the sliding gesture may comprise a movement that passes through the virtual keys for the characters "h," "a," "p," "p," and "y." In this example, decoder module 46 may determine that the sliding gesture most likely corresponds to the character string "happy." Furthermore, decoder module 46 may determine that the sliding gesture terminates at a position that corresponds to a word delimiter, such as a space character or period. In this way, decoder module 46 may determine that a user input corresponds to a string of one or more alphanumeric characters followed by the word delimiter.

Figure 9A:
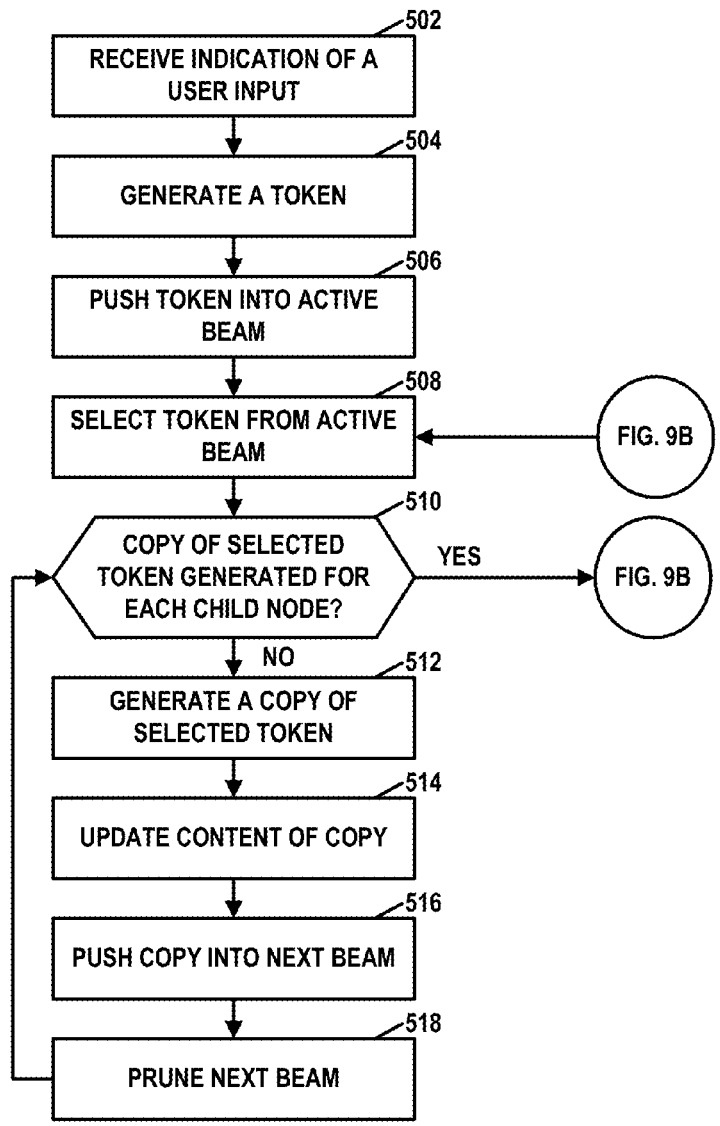
FIGS. 9A and 9B are flowcharts that illustrate an example operation of the computing device for interpreting user input, in accordance with one or more aspects of this disclosure.
Figure 9B:
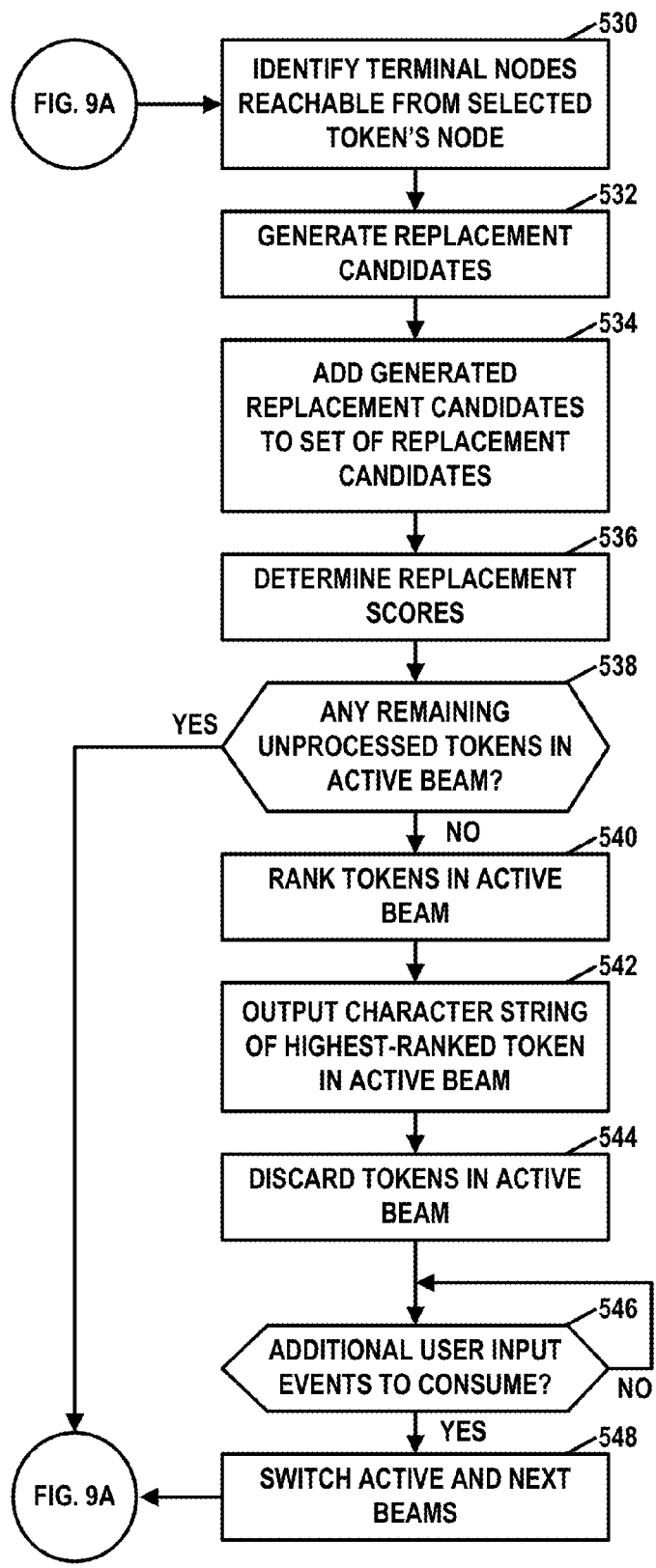

Decoder module 46 may determine, based at least in part on the user input events, a set of replacement candidates and replacement scores for the replacement candidates. Each of the replacement candidates may include one or more words in lexicon 7. Decoder module 46 may determine the replacement candidates and replacement scores in various ways. For example, decoder module 46 may use one or more finite state transducers (FSTs) to determine the replacement candidates and the replacement scores. FIGS. 9A and 9B, described in detail below, are flowcharts that illustrate an example operation that may determine the replacement candidates and replacement scores using an FST.

After decoder module 46 determines the replacement candidates and the replacement scores for the replacement candidates, auto-replacement module 48 may determine, in response to decoder module 46 determining that a user input event corresponds to a word delimiter, a top-ranked replacement candidate. The top-ranked replacement candidate may be the replacement candidate with a lowest replacement score. In addition, auto-replacement module 48 may determine whether a relevant character strings for the top-ranked replacement candidate includes a word that do not match a word in lexicon 7. In response to determining that the relevant character string includes a word that does not match a word in lexicon 7, auto-replacement module 48 may output, based at least in part on a comparison of a replacement score of a replacement candidate and an auto-replacement threshold, the top-ranked replacement candidate in place of the relevant character string. In some examples, auto-replacement module 48 may determine whether the replacement score for the top-ranked auto-replacement candidate is lower than an auto-replacement threshold. In response to determining that the replacement score for the top-ranked replacement candidate is less than the auto-replacement threshold, auto-replacement module 48 may output, for display at user interface device 4, the top-ranked replacement candidate in place of the relevant character string for the top-ranked auto-replacement candidate.

Furthermore, suggestion module 50 may select, based at least in part on the replacement scores of the replacement candidates, at least a portion of the replacement candidates. Suggestion module 50 may then output the selected replacement candidates in suggestion elements 20. In other words, suggestion module 50 may populate the selected replacement candidates into suggestion elements 20. In some examples, decoder module 46 may determine a set of replacement candidates for auto-replacement and a separate set of replacement candidates for use in populating suggestion elements 20. Furthermore, in some examples, decoder module 46 may determine a set of replacement scores for auto-replacement and a separate set of replacement scores for use in populating suggestion elements 20.

Suggestion module 50 may determine, based on one or more user input events, that a user has selected one of suggestion elements 20. In response, suggestion module 50 may output, for display at user interface device 4, the replacement candidate associated with the selected suggestion element in place of a portion of the displayed text. For instance, suggestion module 50 may output the selected suggestion element's replacement candidate in place of one or more words.

Figure 3:
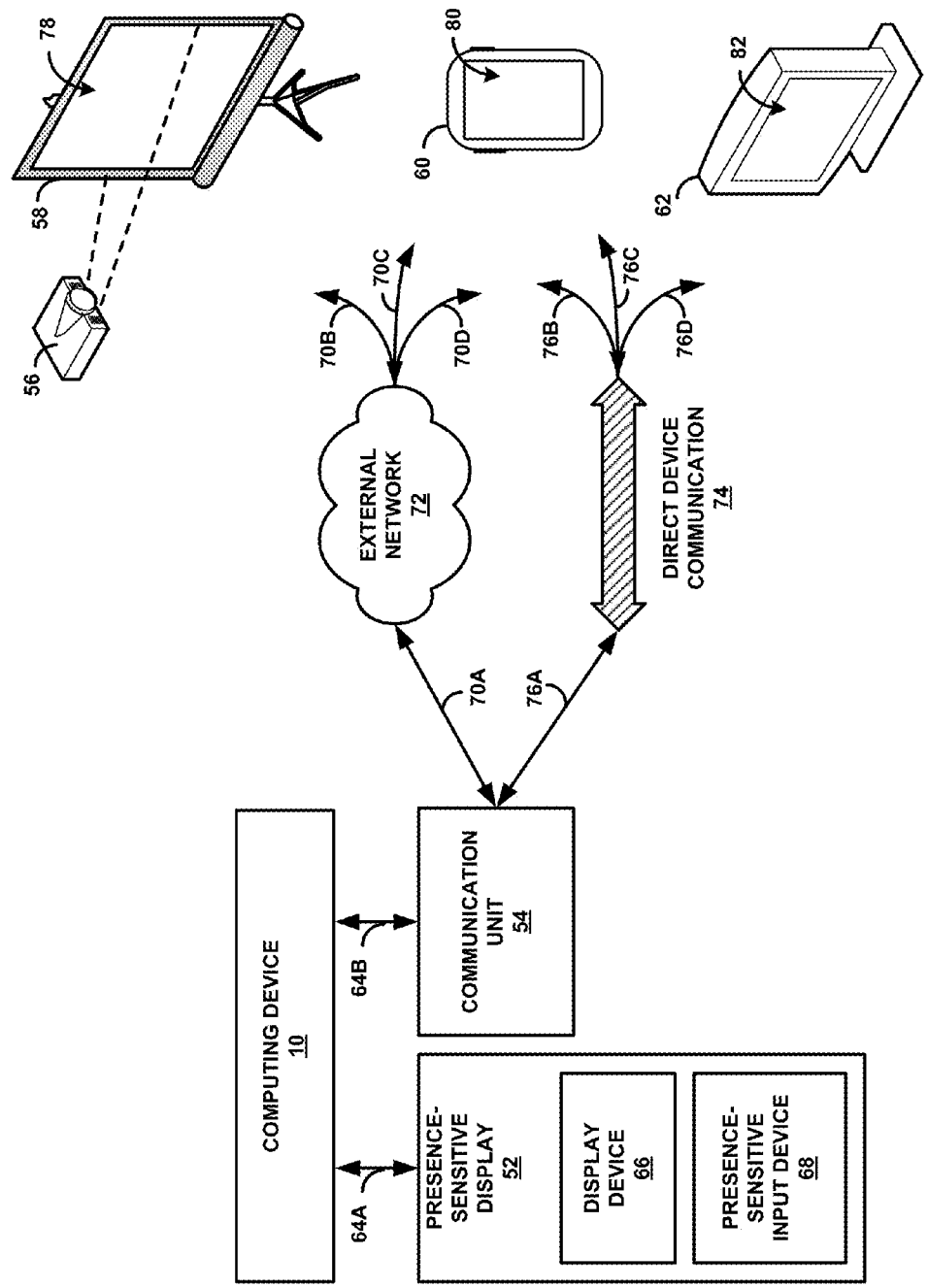
FIG. 3 is a block diagram illustrating an example in which a computing device outputs graphical content for display at a remote display device, in accordance with one or more aspects of the present disclosure.

FIG. 3 is a block diagram illustrating an example computing device 10 that outputs data for display by one or more remote devices, in accordance with one or more techniques of the present disclosure. The one or more remote devices may display graphical content based on the data output by computing device 10. In general, graphical content may include any visual information that may be output for display, such as text, images, a group of moving images, etc. In some examples, computing device 10 may output data, such as Hypertext Markup Language (HTML) data, that a remote device may render to generate graphical content displayed by the remote device. In other examples, computing device 10 may output digital or analog signals that a remote device may use to generate graphical content displayed by the remote device.

In the example of FIG. 3, computing device 10 is operatively coupled to a presence-sensitive display 52 and a communication unit 54. Furthermore, in the example of FIG. 3, the one or more remote devices include a projector 56, a projection screen 58, a mobile device 60, and a visual display device 62. Computing device 10 may include and/or be operatively coupled to one or more other devices, e.g., input devices, output devices, memory, storage devices, etc. that are not shown in FIG. 3 for purposes of brevity and illustration.

Computing device 10 may be a processor that has the functionality described above with respect to processor 30 (FIG. 2). For instance, computing device 10 may be a microprocessor, ASIC, or another type of integrated circuit configured to implement the techniques of this disclosure. In other examples, such as those illustrated in FIGS. 1A, 1B, and 2, computing device 10 may be a stand-alone computing device that includes or is operatively coupled to a presence-sensitive display. In such examples, computing device 10 may be a desktop computer, a tablet computer, a smart television platform, a camera, a personal digital assistant (PDA), a server device, a mainframe computer, a telephone, a portable gaming device, a personal media player, a remote control device, a wearable computing device, or another type of computing device. In this disclosure, a first device may be said to be operatively coupled to a second device if the operations of the first and second devices are coupled in some way.

Computing device 10 may communicate with presence-sensitive display 52 via a communication channel 64A. Computing device 10 may communicate with communication unit 54 via a communication channel 64B. Communication channels 64A, 64B may each include a system bus or another suitable connection. Although the example of FIG. 3 shows computing device 10, presence-sensitive display 52, and communication unit 54 as being separate, computing device 10, presence-sensitive display 52, and/or communication unit 54 may be integrated into a single device.

In the example of FIG. 3, presence-sensitive display 52 includes a display device 66 and a presence-sensitive input device 68. Display device 66 may display graphical content based on data received from computing device 10. Presence-sensitive input device 68 may determine one or more user inputs (e.g., continuous gestures, multi-touch gestures, single-touch gestures, etc.). Presence-sensitive input device 68 may use capacitive, inductive, and/or optical recognition techniques to determine the user inputs. Presence-sensitive display 52 may send indications of such user inputs to computing device 10 via communication channel 64A or another communication channel. In some examples, presence-sensitive input device 68 is physically positioned relative to display device 66 such that presence-sensitive input device 68 is able to detect the presence of an input object (e.g., a finger or a stylus) at a location on display device 66 that displays a graphical element when a user positions the input object at the location on display device 66 that displays the graphical element.

Communication unit 54 may have the functionality of communication unit(s) 34. This disclosure describes the functionality of communication unit 34 with regard to FIG. 2. Examples of communication unit 54 may include network interface cards, Ethernet cards, optical transceivers, radio frequency transceivers, Bluetooth, 3G, and WiFi radios, Universal Serial Bus (USB) interfaces, or other types of devices that are able to send and receive data. When computing device 10 outputs data for display by the one or more remote devices (such as projector 56, projection screen 58, mobile device 60, and visual display device 62), computing device 10 may output the data to a communication unit of computing device 10, such as communication unit 54. Communication unit 54 may send the data to one or more of the remote devices. The one or more remote devices may display graphical content based at least in part on the data.

Communication unit 54 may send and receive data using various communication techniques. In the example of FIG. 3, a network link 70A operatively couples communication unit 54 to an external network 72. Network links 70B, 70C, and 70D may operatively couple each of the remote devices to external network 72. External network 72 may include network hubs, network switches, network routers, or other types of devices that exchange information between computing device 10 and the remote devices illustrated in FIG. 3. In some examples, network links 70A-70D may be Ethernet, ATM or other wired and/or wireless network connections.

In some examples, communication unit 54 may use direct device communication 74 to communicate with one or more of the remote devices included in FIG. 3. Direct device communication 74 may include communications through which computing device 10 sends and receives data directly with a remote device, using wired or wireless communication. That is, in some examples of direct device communication 74, data sent by computing device 10 may not be forwarded by one or more additional devices before being received at the remote device, and vice-versa. Examples of direct device communication 74 may include Bluetooth, Near-Field Communication, Universal Serial Bus, WiFi, infrared, etc. One or more of the remote devices illustrated in FIG. 3 may be operatively coupled with communication unit 54 by communication links 76A-76D. In some examples, communication links 76A-76D may be connections using Bluetooth, Near-Field Communication, Universal Serial Bus, infrared, etc. Such connections may be wireless and/or wired connections.

In the example of FIG. 3, projector 56 receives data from computing device 10. Projector 56 may project graphical content based on the data onto projection screen 58. The example of FIG. 3 shows projector 56 as a tabletop projector and shows projection screen 58 as a freestanding screen. In other examples, computing device 10 may output data for display by other types of projection devices, such as electronic whiteboards, holographic display devices, and other suitable devices for displaying graphical content.

In some examples, projector 56 may determine one or more user inputs (e.g., continuous gestures, multi-touch gestures, single-touch gestures, etc.) at projection screen 58 and send indications of such user input to computing device 10. In such examples, projector 56 may use optical recognition or other suitable techniques to determine the user input. Projection screen 58 (e.g., an electronic whiteboard) may display graphical content based on data received from computing device 10.

Mobile device 60 and visual display device 62 may each have computing and connectivity capabilities and may each receive data that computing device 10 output for display. Examples of mobile device 60 may include e-reader devices, convertible notebook devices, hybrid slate devices, etc. Examples of visual display device 62 may include televisions, computer monitors, etc. As shown in FIG. 3, projection screen 58 may include a presence-sensitive display 78, mobile device 60 may include a presence-sensitive display 80, and visual display device 62 may include a presence-sensitive display 82. Presence-sensitive displays 78, 80, 82 may have some or all of the functionality described in this disclosure for UI device 4. In some examples, presence-sensitive displays 78, 80, 82 may include functionality in addition to the functionality of UI device 4. Presence-sensitive displays 78, 80, 82 may receive data from computing device 10 and may display graphical content based on the data. In some examples, presence-sensitive displays 78, 80, 82 may determine one or more user inputs (e.g., continuous gestures, multi-touch gestures, single-touch gestures, etc.) and send indications of such user input to computing device 10. Presence-sensitive displays 78, 80, and/or 82 may use capacitive, inductive, optical recognition techniques and/or other techniques to determine the user input.

In some examples, computing device 10 does not output data for display by presence-sensitive display 52. In other examples, computing device 10 may output data for display such that both presence-sensitive display 52 and the one or more remote devices display the same graphical content. In such examples, each respective device may display the same graphical content substantially contemporaneously. In such examples, the respective devices may display the graphical content at different times due to communication latency. In other examples, computing device 10 may output data for display such that presence-sensitive display 52 and the one or more remote devices display different graphical content.

In the example of FIG. 3, computing device 2 may receive a first series of one or more user inputs from one or more of presence-sensitive input device 68 and presence-sensitive displays 78, 80, and 82. In response to determining that the first series of one or more user inputs corresponds to a first string of characters, computing device 2 may output, for display at one or more of display device 66, presence-sensitive displays 78, 80, and 82, the first string of characters. In response to determining that the first string ends with a word delimiter, computing device 2 may output, for display at one or more of display device 66 and presence-sensitive displays 78, 80, and 82, a second string of characters in place of the first string of characters. After receiving the first series of one or more user inputs, computing device 2 may receive a second series of one or more user inputs from one or more of display device 66 and presence-sensitive displays 78, 80, and 82. In response to determining that the second series of one or more user inputs corresponds to a third string of characters, computing device 2 may output, for display at one or more of display device 66, presence-sensitive displays 78, 80, and 82, the third string. Computing device 2 may determine, based at least in part on the first and second series of one or more user inputs, a fourth string of characters. In addition, computing device 2 may output, for display at one or more of display device 66, presence-sensitive displays 78, 80, and 82, the fourth string in place of the second and third strings.

FIGS. 4A and 4B are conceptual diagrams that illustrate the correction of a misplaced space character, in accordance with one or more aspects of the present disclosure. As illustrated in the example of FIG. 4A, a user has entered the character string "thi" followed by the space character. In the example of FIG. 4A, IME module 6 may identify one or more replacement candidates in response to determining that the user input events correspond to the character string "thi." However, in the example of FIG. 4A, none of the replacement candidates has a replacement score that is below the auto-replacement threshold. Accordingly, even though the character string "thi" does not match a word in lexicon 7, IME module 6 does not replace the character string "thi" with a word in lexicon 7 when IME module 6 receives user input events that correspond to the space character.

Subsequently, as shown in the example of FIG. 4A, IME module 6 may determine that a subsequent series of user input events corresponds to the character string "sis." In response, computing device 2 displays the character string "sis" in GUI 10 after the character string "thi" and the space character. In addition, IME module 6 may determine a second set of replacement candidates. IME module 6 may output a portion of the replacement candidates in suggestion elements 20. In the example of FIG. 4A, IME module 6 outputs the character strings "the sis," "this is," and "this sister" in suggestion elements 20.

If IME module 6 determines that one or more user input events corresponds to a user selection of one of suggestion elements 20, IME module 6 may determine a relevant character string for the replacement candidate contained in the selected suggestion element. IME module 6 may then output the replacement candidate in place of the relevant character string. For instance, if IME module 6 receives an indication of a user input to select suggestion element 20B, IME module 6 may determine that "thi sis" is the relevant character string for the replacement candidate "this is." As shown in FIG. 4B, IME module 6 may then output the replacement candidate "this is" in place of the relevant character string "thi sis." Alternatively, in the example of FIG. 4A, IME module 6 may determine that a series of user input events corresponds to the character string "thi sis" followed by a space character. IME module 6 may determine that the highest-ranked replacement candidate is "this is" and that the relevant character string for the highest-ranked replacement candidate is "thi sis." Accordingly, as shown in FIG. 4B, IME module 6 may automatically output "this is" in place of "thi sis."

In the example of FIGS. 4A and 4B, "sis" may comprise a first character "s" followed by a substring "is." In the example of FIGS. 4A and 4B, "this is" comprises a first string "thi" followed by the first character "s," followed by a word delimiter " ", followed by the substring "is." The first string "thi" followed by the first character "s" and the substring "is" match words in lexicon 7.

In an example similar to the example of FIGS. 4A and 4B, IME module 6 may determine that a first series of user inputs corresponds to a first string (e.g., "thisi") that comprises a substring ("this") followed by one or more misplaced characters ("i"). In this example, IME module 6 may determine that a subsequent series of user inputs corresponds to a second string (e.g., "s"). In this example, a replacement candidate (e.g., "this is") may comprise the substring ("this"), followed by word delimiter (e.g., " "), followed by the one or more misplaced characters ("i") followed by the second string ("s"). The substring and the one or more misplaced characters followed by the third string match words in lexicon 7.

Figures 5A, 5B:
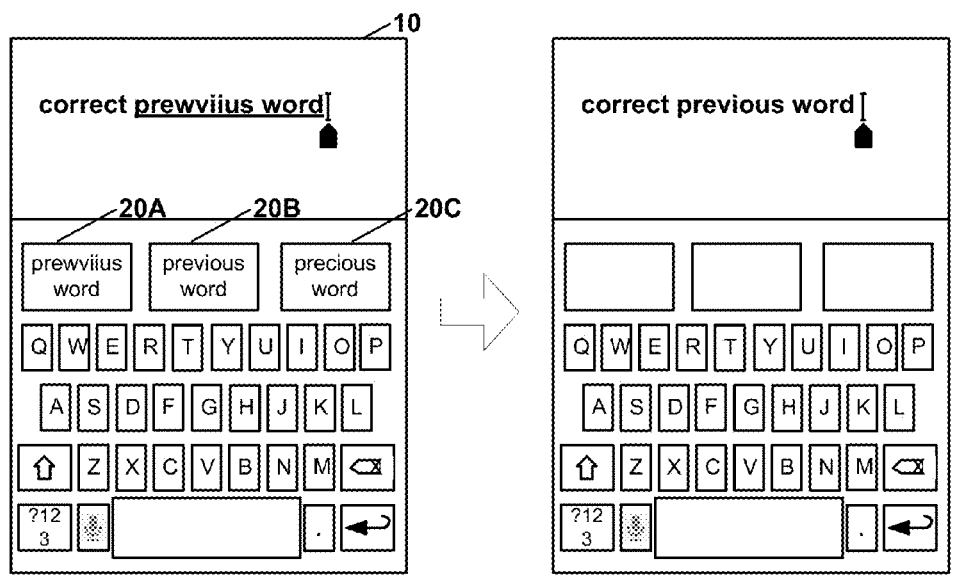
FIGS. 5A and 5B are conceptual diagrams that illustrate the correction of a previous word, in accordance with one or more aspects of the present disclosure.

FIGS. 5A and 5B are conceptual diagrams that illustrate the correction of a previous word, in accordance with one or more aspects of the present disclosure. As illustrated in the example of FIG. 5A, a user has previously entered the text "correct prewviius word." The character string "prewviius" does not match any word in an English-language lexicon. However, the character string "word" does match a word in the English-language lexicon.

Accordingly, in the example of FIG. 5A, IME module 6 may determine a set of replacement candidates and output a portion of the replacement candidates in suggestion elements 20. The relevant character string for each of the replacement candidates may be the character string "prewviius word." Accordingly, as shown in the example of FIG. 5A, IME module 6 may include in GUI 10 a visual indication of which characters are in the relevant character string. In the example of FIG. 5A, IME module 6 underlines the character string "prewviius word" to indicate this character string is the relevant character string. In other examples, IME module 6 may highlight, italicize, enlarge, change the color of, or include another visual indication in GUI 10 of which characters are in the applicable character string.

If IME module 6 receives an indication of a user input to select one of suggestion elements 20, IME module 6 may output the character string that corresponds to the selected suggestion element in place of the relevant character string with. For instance, in the example of FIG. 5B, IME module 6 may output the character string "previous word" in place of the character string "prewviius word" in response to determining that one or more user input events correspond to a user selection of suggestion element 20B.

In some examples, IME module 6 may automatically output the top-ranked replacement candidate in place of the character string "prewviius word" if IME module 6 determines that one or more user input events corresponds to a word delimiter, if "prewviius word" is the relevant character string for the top-ranked replacement candidate, and if the top-ranked replacement candidate's replacement score is below the auto-replacement threshold.

FIGS. 6A and 6B are conceptual diagrams that illustrate the correction of a word that includes an erroneous space character in place of a non-space character. In the example of FIG. 6A, the user intended to input the word "someone," but inadvertently selected the space character instead of a key for the letter "n." Accordingly, IME module 6 may output the character string "someo e" in GUI 10.

In response, IME module 6 may populate the replacement candidates "someo e," "someone," and "Simone" into suggestion elements 20. IME module 6 may output a replacement candidate in place of the character string "someo e" in response to determining that one or more user input events correspond to a user selection of a suggestion element that contains the replacement candidate. For example, IME module 6 may, as shown in FIG. 6B, output the replacement candidate "someone" in place of the character string "someo e" in response to determining that one or more user input events correspond to a user selection of suggestion element 20B. In the example of FIGS. 6A and 6B, the replacement candidate "someone" matches a first string ("someo"), followed by an alphanumeric character "n," followed by a second string ("e"). Moreover, IME module 6 may automatically output a top-ranked replacement candidate (e.g., "someone") in place of the character string "someo e" if IME module 6 determines that one or more user input events correspond to a word delimiter and if the top-ranked replacement candidate's replacement score is below an auto-replacement threshold.

FIGS. 7A and 7B are conceptual diagrams that illustrate the correction of a word that includes an erroneous space character. In the example of FIG. 7A, the user intended to input the word "sentence" but inadvertently selected the space character between the letters "t" and "e" of the word "sentence." In response, IME module 6 may output the replacement candidates "sent ence," "sentence," and "tense" in suggestion elements 20.

IME module 6 may output the replacement candidate in place of the relevant character string for a replacement candidate in response to determining that one or more user input events corresponds to a user selection of a suggestion element that corresponds to the replacement candidate. For example, the relevant character string for the replacement candidate in suggestion element 20B may be "sent ence." In this example, if IME module 6 determines that one or more user input events correspond to a user selection of suggestion element 20B, IME module 6 may output the replacement candidate "sentence" in place of "sent ence" as shown in FIG. 6B. The relevant character string for the replacement candidate in suggestion element 20C may be "ence." Accordingly, if IME module 6 determines that one or more user input events correspond to a user selection of suggestion element 20C, IME module 6 may output "tense" in place of "ence."

Moreover, IME module 6 may automatically output a top-ranked replacement candidate ("sentence") in place of the character string "sent ence" if IME module 6 determines that one or more user input events correspond to a word delimiter, if the relevant character string for the top-ranked replacement candidate is "sent ence," and if the top-ranked replacement candidate's replacement score is below an auto-replacement threshold. IME module 6 may automatically replace the character string "ence" with a top-ranked replacement candidate ("tense") if IME module 6 determines that one or more user input events correspond to a word delimiter, if the relevant character string for the top-ranked replacement candidate is "ence," and if the top-ranked replacement candidate's replacement score is below an auto-replacement threshold.

In the example of FIGS. 7A and 7B, IME module 6 may determine that a first series of user inputs corresponds to a first string ("sent"). In addition, IME module 6 may determine that a second series of user inputs corresponds to a second string ("ence"). In the example of FIGS. 7A and 7B, IME module 6 may determine a replacement candidate ("sentence") that matches a word in lexicon 7 and is equal to the first string ("sent") appended with the second string ("ence").

Figure 8:
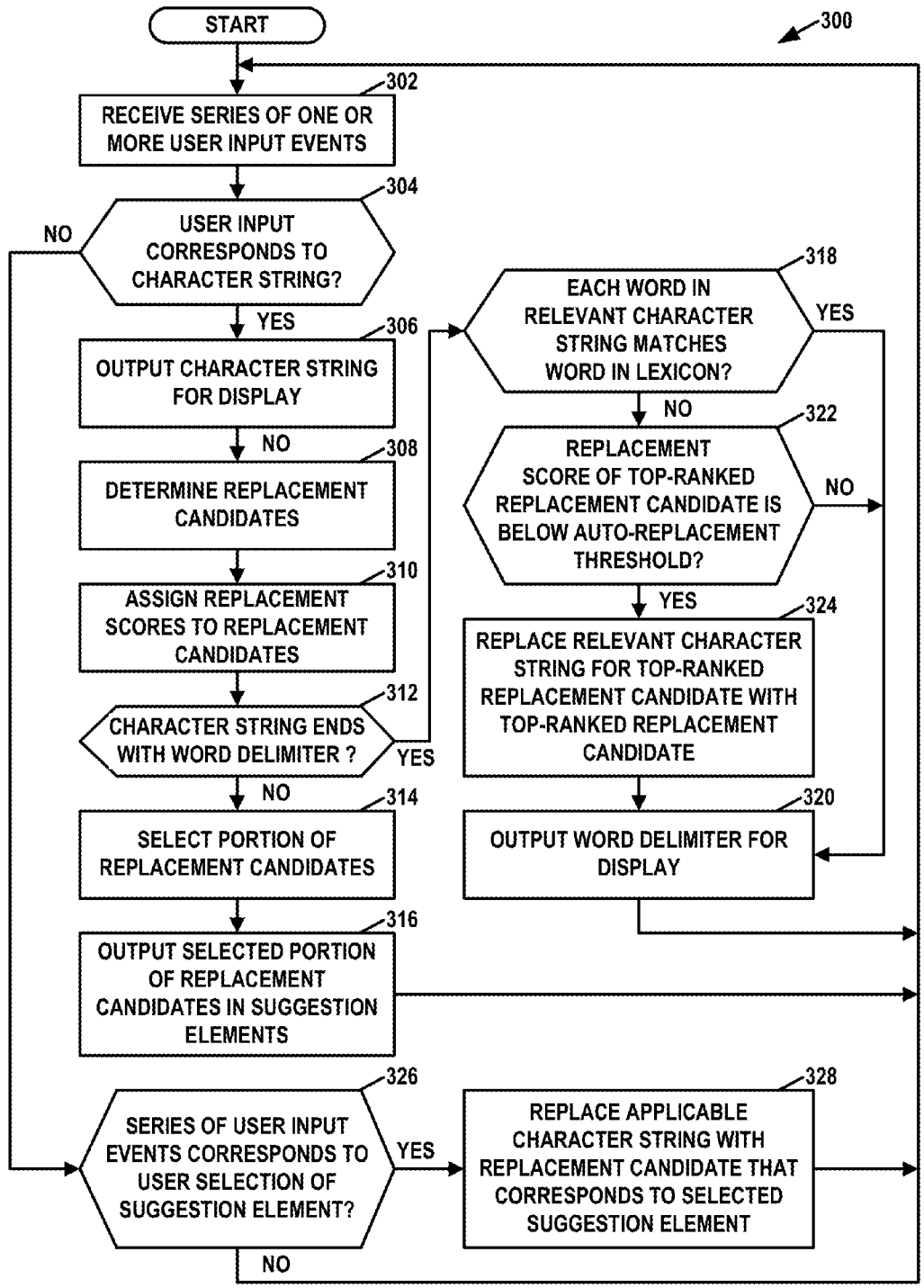
FIG. 8 is a flowchart that illustrates an example operation of an input method editor (IME) module, in accordance with one or more aspects of the present disclosure.

FIG. 8 is a flowchart that illustrates an example operation 300 of IME module 6, in accordance with one or more aspects of this disclosure. In the example of FIG. 8, IME module 6 may receive a series of one or more user input events (302). The series of user input events may indicate a series of one or more user inputs received by computing device 2. IME module 6 may determine whether the series of user input events corresponds to a character string (304). The character string may include one or more characters. In response to determining that the series of user input events corresponds to a character string ("YES" branch of 304), IME module 6 may output the character string for display at user interface device 4 (306). For example, if IME module 6 determines that the series of user input events corresponds to the character string "thi," IME module 6 may output the character string "thi" for display at user interface device 4.

Furthermore, if IME module 6 determines that the series of user input events corresponds to a character string, IME module 6 may determine a set of one or more replacement candidates (308). In some instances, IME module 6 may determine a plurality of replacement candidates. Each of the replacement candidates may be a character string. In some examples, IME module 6 may determine the set of replacement candidates based on multiple series of user input events. For example, IME module 6 may determine that a first series of user input events corresponds to a first character string. In this example, the first character string does not match a word in lexicon 7 and IME module 6 may auto-replace the first character string with a second character string. Furthermore, in this example, IME module 6 may receive a second, subsequent series of user input events. In this example, IME module 6 may determine the set of replacement candidates based at least in part on the first and second series of user input events.

In addition, IME module 6 may assign replacement scores to the replacement candidates (310). IME module 6 may perform various operations to assign the replacement scores to the replacement candidates. For instance, in some examples, IME module 6 may perform the example operation of FIGS. 9A and 9B to determine the character string, determine the set of replacement candidates, and assign the replacement scores.

IME module 6 may also determine whether the character string ends with a word delimiter (312). Example word delimiters include space characters, return characters, commas, periods, question marks, parenthesis, and so on. In response to determining that the character string does not end with a word delimiter ("NO" branch of 312), IME module 6 may select, based at least in part on the replacement scores assigned to the replacement candidates, a portion of the replacement candidates (314). IME module 6 may then output the selected portion of the replacement candidates in suggestion elements 20 (316). Each of suggestion elements 20 may specify a different replacement candidate in the portion of the set of replacement candidates.

In response to determining that the character string ends with a word delimiter ("YES" branch of 312), IME module 6 may determine whether each word in the relevant character string for the top-ranked replacement candidate matches a word in lexicon 7 (318). In response to determining that each word in the relevant character string for the top-ranked replacement candidate matches a word in lexicon 7 ("YES" branch of 318), IME module 6 may output the word delimiter for display at user interface device 4 (320) and wait to receive additional user input events (302).

On the other hand, in response to determining that one or more words in the relevant character string for the top-ranked replacement candidate do not match any words in lexicon 7 ("NO" branch of 318), IME module 6 may determine whether the replacement score for the top-ranked replacement candidate is below an auto-replacement threshold (322). In response to determining that the replacement score for the top-ranked replacement candidate is not below the auto-replacement threshold ("NO" branch of 322), IME module 6 may output the word delimiter for display at user interface device 4 (320) and wait to receive additional user input events (302).

However, in response to determining that the replacement score for the top-ranked replacement candidate is below the auto-replacement threshold ("YES" branch of 322), IME module 6 may output, for display at user interface device 4, the top-ranked replacement candidate in place of the relevant character string for the top-ranked replacement candidate (324). For example, if the relevant character string for the top-ranked replacement candidate is "thesa" and the top-ranked replacement candidate is "thesaurus," IME module 6 may output "thesaurus" in place of "thesa." In another example, IME module 6 may determine that a first series of user inputs corresponds to a first character string (e.g., "eo" in FIG. 1) and may auto-replace the first character string with a second character string (e.g. "do" in FIG. 1). In this example, IME module 6 may determine that a subsequent, second series of user inputs corresponds to a third character string (e.g., "haopy" in FIG. 1). In this example, "do haopy" is the relevant character string and IME module 6 may output, in response to determining that the third character string ends with a word delimiter, a fourth string (e.g., "so happy" in FIG. 1) in place of the second and third strings. In this example, the fourth string may have a lowest replacement score among the set of replacement candidates.

After outputting the top-ranked replacement candidate in place of the relevant character string, IME module 6 may output the word delimiter for display at user interface device 4 (320). IME module 6 may then wait to receive an additional user input events (302).

In response to determining that the series of user input events does not correspond to a character string ("NO" branch of 304), IME module 6 may determine whether the series of user input events corresponds to a user selection of one of suggestion elements 20 (326). In response to determining that the series of user input events does not correspond to a user selection of one of suggestion elements 20 ("NO" branch of 326), IME module 6 may process the series user input events and wait to receive additional user input events (302).

In response to determining that the series of user input events corresponds to a user selection of one of suggestion elements 20 ("YES" branch of 326), IME module 6 may output, for display at user interface device 4, the replacement candidate of the selected suggestion element in place of the relevant character string for the replacement candidate of the selected suggestion element (328). After replacing the relevant character string, IME module 6 may wait to receive additional user input events (302). For example, if the relevant character string for the replacement candidate of the selected suggestion elements is "do haopy" and the replacement candidate of the selected suggestion element is "so happy," IME module 6 may output "so happy" in place of "do haopy." Thus, in this example, if IME module 6 auto-replaced a first string ("eo") with a second string ("do") and determined that a subsequent series of user inputs corresponds to a third string ("haopy"), IME module 6 may, in response to receiving a user input to select a suggestion element that contains a fourth string ("so happy"), output the fourth string in place of the second and third strings.

FIG. 9A is a flowchart that illustrates an example operation 500 of computing device 2 for interpreting user input, in accordance with one or more aspects of this disclosure. IME module 6 may perform operation 500 to determine whether a series of user input events corresponds to a character string, output the character string for display, determine replacement candidates, and assign replacement scores to replacement candidates in actions 304-310 of operation 300.

In the example of FIGS. 9A and 9B, IME module 6 uses a lexicon finite state transducer (FST) to determine that a series of user inputs corresponds to a character string and also to determine replacement candidates and replacement scores. The lexicon FST may include a plurality of nodes and a plurality of arcs. The nodes may include an entry node, a plurality of terminal nodes, and a plurality of non-terminal nodes. Each node other than the entry node may have exactly one incoming arc and at least one outgoing arc. An incoming arc of a node may be an arc that leads from another one of the nodes to the node. An outgoing arc of a node may be an arc that leads from the node to another one of the nodes. A node is referred to herein as a child node of another node if there is an arc that leads from the other node to the node.

Each of the terminal nodes may be associated with a character string that includes one or more words in lexicon 7. Each of the terminal nodes may be reached from the entry node by following a series of one or more arcs through the lexicon FST. Each of the terminal nodes may have an outgoing arc that leads back to the entry node of the lexicon FST.

Each of the arcs may be associated with an input character. The input character of an arc may be an alphanumeric character and/or a word delimiter. Furthermore, the input character of an arc may be a lambda character. The lambda character is a placeholder for a character. When the input character of an arc is the lambda character, no user input events are consumed by following the arc. The lambda character may be associated with the outgoing arcs from the terminal nodes to the entry node.

IME module 6 may receive an indication of a user input (502). In other words, IME module 6 may receive a user input event. In response, IME module 6 may generate a token that is associated with an entry node of a lexicon FST (504). A token may be data structure that stores several pieces of data. IME module 6 may push the token into an active beam (506). In the context of FIGS. 9A and 9B, a beam may be a data structure that stores tokens. When IME module 6 pushes the token into the active beam, the contents of the active beam may be represented by Table 1, below.

TABLE 1

| Index | Parent Index | Character of Node | Character Chain | Cost Value | Look ahead score |
|---|---|---|---|---|---|
| 0 | — | — | — | 0 | 0 |

In Table 1, each row represents an individual token. For each token, the index column indicates a unique index value for the token. For each token, the parent index column indicates the parent index value of the token. A token's parent index is the index of the token's parent token. A particular token may be the parent token of another token if IME module 6 generated the other token as a copy of the particular token. For each token, the character of node column may indicate an input character of an arc leading from the node associated with the token's parent to the node associated with the token. For each token, the character chain column may indicate the character chain of the token's parent concatenated with the input character of the arc leading from the node associated with the token's parent to the node associated with the token. For each token, the cost value column may indicate a cost value of the token. The cost value of the token may be equal to the cost value of the token's parent plus a cost value of the arc leading from the node associated with the token's parent to the node associated with the token. As shown in Table 1, the token has an index of 0 (i.e., token0), no parent index, no character of the node, no character chain, and a cost value of zero.

After pushing the token into the active beam, IME module 6 may select a token from the active beam (508). IME module 6 may then determine whether a copy of the selected token has been generated for each child node of the node associated with the selected token (510). For ease of explanation, this disclosure may describe the node associated with a token as the token's node. If IME module 6 determines that a copy of the selected token has not yet been generated for a child node of the token's node ("NO" branch of 510), IME module 6 may generate a copy of the selected token and may associate the copy with the child node (512). If the selected token's node is a terminal node, the child node may be the entry node of the lexicon FST. IME module 6 may then update the content of the copy (514).

When IME module 6 updates the content of the copy, IME module 6 may update the index of the copy such that the copy has an index that is unique among tokens in the next beam. In addition, IME module 6 may update the parent index of the copy to indicate the index of the selected token. IME module 6 may also update the character-of-node field of the copy to indicate the input character associated with the arc from the selected token's node to the copy's node. In addition, IME module 6 may update the character chain field of the copy to append the input character associated with the arc from the selected token's node to the copy's node. IME module 6 may also update the cost value field of the copy to add a cost value associated with the arc from the selected token's node to the copy's node.

In some examples, IME module 6 may determine whether the copy's character chain includes more than a particular number of word delimiters. For instance, IME module 6 may determine whether the copy's character chain includes more than two word delimiters. In response to determining that the copy's character chain includes more than the particular number of word delimiters, IME module 6 may remove old characters from the copy's character chain and old costs from the copy's cost value. The old characters may be characters that occur in the copy's character chain before an earliest word delimiter in the copy's character chain. The old costs may be costs associated with the old characters.

IME module 6 may determine the cost value associated with the arc in various ways. In some examples, IME module 6 may determine the cost value associated with the arc based at least in part on a character-level cost value for the arc. IME module 6 may use a character-level FST to determine the character-level cost value for the arc. The character-level FST may be an FST like the lexicon FST described above. For ease of explanation, the character-level FST may be referred to herein as the C-FST.

A C-FST may include a plurality of nodes connected by arcs. Each of the arcs may have an input character. In this example, IME module 6 may determine the character-level cost value for a character sequence by following a path through the nodes of the C-FST and summing the costs of arcs along the path. The output characters of the arcs on the path match the characters of the copy's character chain. For each of the arcs in the path through the nodes of the C-FST, IME module 6 may determine the cost of the arc based at least in part on a spatial model score for the input character of the arc and a language model score for the input character of the arc.

The spatial model score for an input character may indicate a probability that a user input event corresponds to the input character. For instance, if the user input event corresponds to a tapping gesture at a particular location of user interface device 4, the spatial model score for the input character may be correlated with a spatial distance between the particular location and the virtual key for the input character.

The language model score for the input character may indicate a probability of the input character given the input characters of the preceding arcs in the path. For instance, if the input character does not typically follow the input character of the preceding arc of the path, the input character may receive a low language model score. For example, the character "k" does not typically follow the character "f" in the English language. Accordingly, in this example, the letter "k" may receive a low language model score if the input character of the preceding arc is "f."

The lambda character may be the input character or output character for some arcs in the C-FST. No user input events are consumed by transitioning along an arc if the lambda character is the input character of the arc. The C-FST may use an arc that has a particular character as the input character and the lambda character as the output character to model a string that includes the particular character by accident. IME module 6 does not add any characters to a token's character chain by transitioning along an arc that has the lambda character as the output character of the arc. The C-FST may model a string that includes an inadvertently omitted character by following an arc that has the lambda character as the input character and the omitted character as the output character. In this way, arcs with lambda input or output characters may enable the C-FST to model character strings where the user inadvertently omitted or inserted a character, such as an alphanumeric character, space character, or punctuation mark.

In addition to modifying the cost value of the copy in action 514, IME module 6 may determine a look-ahead score for the copy. IME module 6 may determine the look-ahead score for the copy in various ways. For example, IME module 6 may determine the look-ahead score of the copy by determining a trial look-ahead score for each terminal node in the lexicon FST that is reachable from the copy's node. A terminal node is reachable in the lexicon FST from the copy's node if there is a path through the lexicon FST from the copy's node to the terminal node that does not pass through the entry node. IME module 6 may set the look-ahead score of the copy to be the greatest of the trial look-ahead scores. IME module 6 may determine a trial look-ahead score for a terminal node by adding a spatial score for the terminal node and a language score for the terminal node. The spatial score for the terminal node may be based at least in part on the difference between the number of characters in the copy's character chain and the number of characters in the word associated with the terminal node. The language score for the terminal node may be based at least in part on a probability of the terminal node's word, given the n−1 preceding words or candidate words. In accordance with the techniques of this disclosure, IME module 6 may retain the set of candidate strings for previously-entered character strings. IME module 6 may determine the language score for the terminal node based on joint hypotheses of the terminal node's word and the set of candidate strings for a previously-entered word. IME module 6 may determine the terminal node's language score as the probability of the joint hypothesis that has the greatest probability. For example, the set of candidate strings for the previously-entered word may be "eo," "so," and "do," as discussed in examples above. In this example, "do" may be the highest-ranked candidate string based on an earlier series of user inputs. In this example, a terminal node may correspond to the word "happy." Even though "do" was the highest-ranked candidate string, the joint hypothesis with the greatest probability may be "so happy." Hence, the language score for the terminal node may be the probability of the combination "so" and "happy."

As indicated above, IME module 6 may generate a copy of the selected token and update the content of the selected token. Furthermore, IME module 6 may push the copy of the selected token into a next beam (516). After pushing the copy into the next beam, IME module 6 may prune the next beam (518). When IME module 6 prunes the next beam, IME module 6 may compare the cost values of the tokens in the next beam. IME module 6 may discard any tokens in the next beam that are not among the n tokens having the lowest cost values, where n is an integer (e.g., 10). If there are fewer than n tokens in the next beam, IME module 6 does not discard any tokens in the next beam. After pruning the next beam, IME module 6 may determine again whether copies of the selected token have been generated for each child node of the selected token's node (510). If not, IME module 6 may repeat actions 512-518 for another child node of the selected token's node. In this way, IME module 6 may generate a copy of the selected token for each child node of the selected token's node. On the other hand, in response to determining that copies have been generated for each child node of the selected token's node ("YES" branch of 510), IME module 6 may perform the portion of operation 500 illustrated in FIG. 9B.

FIG. 9B is a flowchart that illustrates an example continuation of operation 500. IME module 6 may identify terminal nodes of the lexicon FST that are reachable from the selected token's node without passing through the entry node of the lexicon FST (530). In some examples, IME module 6 may identify the terminal nodes of the lexicon FST that are reachable from the selected token's node after IME module 6 determines that copies of the selected token have been generated for each child node of the selected token's node.

If the selected token's node is a terminal node, the selected token's node is the only reachable terminal node. IME module 6 may generate a replacement candidate associated with each of the identified terminal nodes (532). IME module 6 may add the generated replacement candidates to a set of replacement candidates (534). IME module 6 may generate a replacement candidate associated with a terminal node by concatenating to the selected token's character string the input characters of arcs of the lexicon FST on a path from the selected token's node to the terminal node. For example, if the selected token's character string is "hap" and the input characters of the arcs on the path from the selected token's node to the terminal node are "p" and "y," IME module 6 may generate the replacement candidate "happy." In this way, where a particular token in an active beam is associated with a particular node of the lexicon FST, a replacement candidate may include a word that is associated with a terminal node of the lexicon FST that is reachable from the particular node.

Furthermore, IME module 6 may determine replacement scores for the generated replacement candidates (536). IME module 6 may determine the replacement score for a replacement candidate by adding the selected token's cost value to a look-ahead score for the terminal node associated with the replacement candidate. IME module 6 may determine the look-ahead score for the replacement candidate by adding a spatial score for the terminal node associated with replacement candidate and a language score for the terminal node associated with the replacement candidate. As indicated above, the spatial score for the terminal node may be based at least in part on the difference between the number of characters in the copy's character chain and the number of characters in the word associated with the terminal node. The language score for the terminal node may be based at least in part on a probability of the terminal node's word, given the n−1 preceding words. In this example, IME module 6 may rank replacement candidates with low replacement scores higher than replacement candidates with high replacement scores.

After determining the replacement scores, IME module 6 has finished processing the selected token. IME module 6 may determine whether there are any remaining unprocessed tokens in the active beam (538). If there are one or more remaining unprocessed tokens in the active beam ("YES" branch of 538), IME module 6 may select another token from the active beam (508) (FIG. 9A) and repeat actions 510-536 using this selected token. In this way, IME module 6 may process each token in the active beam. After processing each token in the active beam, there are no remaining unprocessed token in the active beam.

If there are no remaining unprocessed tokens in the active beam ("NO" branch of 538), IME module 6 may rank the tokens in the active beam (540). IME module 6 may rank the tokens in the active beam based at least in part on the cost values of the tokens in the active beam. In some examples, IME module 6 may calculate an output score for each of the tokens in the active beam. The output score for a token may be based at least in part on the cost value of the token and the look-ahead score of the token. For instance, the output score for the token may be equal to a sum of the cost value of the token plus the look-ahead score of the token. In such examples, the token with the lowest output score may be the highest-ranked token. After ranking the tokens in the active beam, IME module 6 may output, for display at user interface device 4, the character string of the highest-ranked token in the active beam (542). In this way, IME module 6 may determine, based at least in part on cost values of tokens in an active beam, a highest-ranked token in the active beam, wherein the highest-ranked token in the active beam specifies the character string. IME module 6 may then discard the tokens in the active beam (544).

The character string relevant to a replacement candidate may be the string of characters that IME module 6 has previously output based on the user input events consumed by the selected token. For example, IME module 6 may receive a series of user input events indexed 0 through 8. In this example, a first token may consume user input events 0 through 8 as the first token traverses arcs having the input characters "e," "o," " ", "h," "a," "o," "p," and "y." Hence, in this example, the first token's character string may be "eo haopy." A second token may consume user input events 0 through 8 as the second token traverses arcs having the input characters "s," "o," ",", "h," "a," "p," "p," and "y." Hence, in this example, the second token's character string is "so happy." The output score of the first token may be lower than the output score of the second token. In this example, the output score of the first token may be lower than the output score of the second token because the points at which user interface device 4 detected an input object may be closer to virtual keys for the characters in the character string "eo haopy" than to the virtual keys for the characters in the character string "so happy." Because the output score of the first token is lower than the output score for the second token, IME module 6 may output "eo haopy" instead of "so happy." However, "so happy" may be among the set of replacement candidates. The relevant string for the replacement candidate "so happy" may be "eo haopy" because "eo haopy" is the string of characters that IME module 6 has previously output based on the user input events consumed by the second token. In this way, an intermediate character string results from concatenating to the selected token's character string the input characters of arcs of the lexicon FST on a path from the selected token's node to the terminal node. In such examples, IME module 6 may add, to the beginning of the intermediate character string, a particular candidate string from a previous set of replacement candidates. A joint hypothesis of the particular candidate string and the intermediate character string may have a greater probability than joint hypotheses of the intermediate character string and any other candidate string in the previous set of replacement candidates.

After discarding the tokens in the active beam, IME module 6 may determine whether there are any additional user input events to consume (546). If there are no additional user input events to consume ("NO" branch of 546), IME module 6 may suspend operation 500 until there are one or more user input events to consume. On the other hand, if there are one or more user inputs to consume ("YES" branch of 546), IME module 6 may switch the active beam and the next beam (548). Thus, the active beam is designated as the next beam and the next beam is designated as the active beam. IME module 6 may then select a token from the active beam (508) and repeat actions 508-536 using this selected token.

Figure 10:
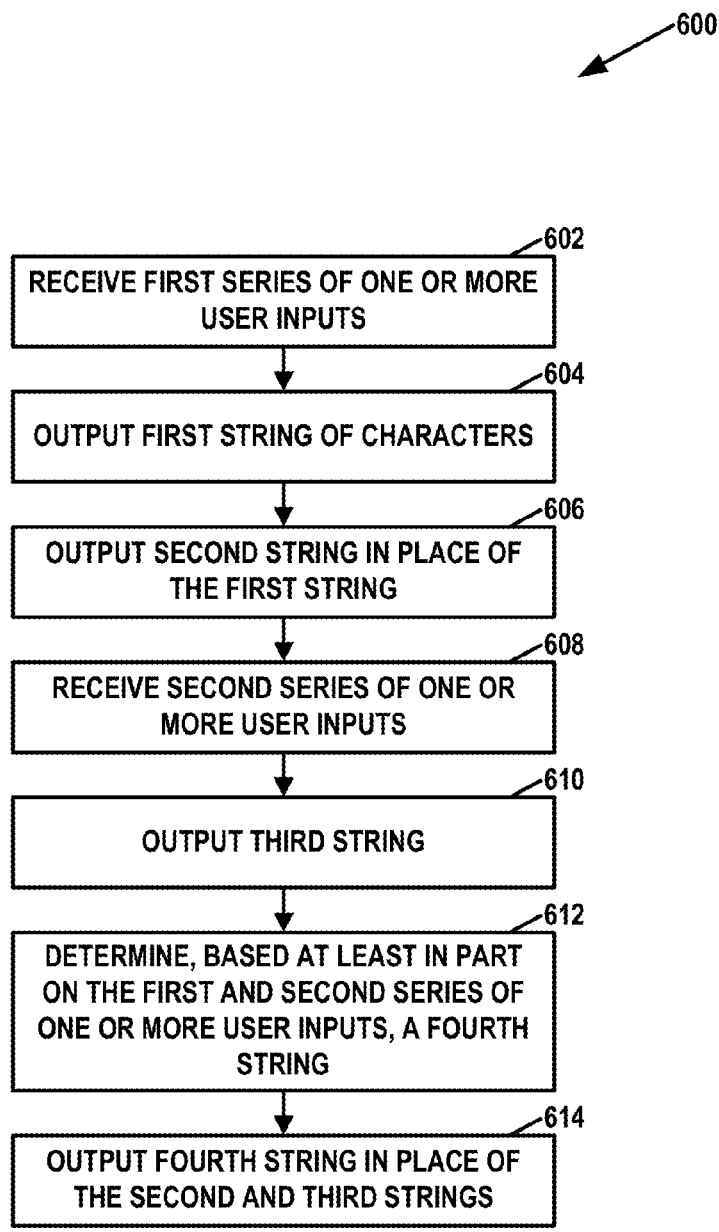
FIG. 10 is a flowchart that illustrates another example operation of a computing device, in accordance with one or more aspects of the present disclosure.

FIG. 10 is a flowchart that illustrates an example operation 600 of computing device 2, in accordance with one or more aspects of this disclosure. The example operation 300 of FIGS. 8A and 8B may be a specific example of operation 600.

In the example of FIG. 10, computing device 2 may receive a first series of one or more user inputs (602). Computing device 2 may output, for display at a display device, a first string of characters based on the first series of one or more user inputs (604). In response to determining that the first string does not match a word in lexicon 7 and in response to determining that the first string ends with a word delimiter, computing device 2 may output, for display at the display device, a second string of characters in place of the first string of characters (606). After receiving the first series of one or more user inputs, computing device 2 may receive a second series of one or more user inputs (608). Computing device 2 may output, for display at the display device, a third string of characters based on the second series of one or more user inputs (610).

In addition, computing device 2 may determine, based at least in part on the first and second series of user inputs, a fourth string of character (612). In some instances, the fourth string may include more than one word in lexicon 7. In other instances, the fourth string may include two or more words in lexicon 7. Computing device 2 may output, for display at the display device, the fourth string of characters in place of the second and third strings of characters (614).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:
1. A method comprising:
receiving, by a computing device, a first series of one or more user inputs;

outputting, by the computing device, for display at a display device, a first string of characters based on the first series of one or more user inputs;

in response to determining that the first string does not match a word in a lexicon and that the first string ends with a word delimiter, outputting, by the computing device and for display at the display device, a second string of characters in place of the first string of characters;

after receiving the first series of one or more user inputs, receiving, by the computing device, a second series of one or more user inputs;

outputting, by the computing device, for display at the display device, a third string of characters based on the second series of one or more user inputs;

determining, by the computing device and based at least in part on the first and second series of one or more user inputs, a fourth string of characters; and outputting, by the computing device and for display at the display device, the fourth string in place of the second and third strings of characters.

2. The method of claim 1, wherein the fourth string does not include more than one word in the lexicon.

3. The method of claim 1, wherein the fourth string includes two or more words in the lexicon.

4. The method of claim 1, wherein:
the method further comprises outputting, by the computing device and for display at the display device, a suggestion element that includes the fourth string of characters; and
outputting the fourth string in place of the second and third strings comprises, in response to receiving an indication of a user input to select the suggestion element, outputting, by the computing device and for display at the display device, the fourth string in place of the second and third strings.

5. The method of claim 4, wherein:
the suggestion element is a first suggestion element;
determining the fourth string comprises:
   determining, by the computing device and based at least in part on the first and second series of one or more user inputs, a plurality of replacement candidates, each of the replacement candidates being a string of characters; and
   selecting, by the computing device, a portion of the plurality of replacement candidates, the portion of the plurality of replacement candidates including the fourth string; and
the method further comprises outputting a plurality of suggestion elements, the plurality of suggestion elements including the first suggestion element, each of the suggestion elements specifying a different replacement candidate in the portion of the plurality of replacement candidates.

6. The method of claim 1, wherein the word delimiter is a first word delimiter and outputting the fourth string comprises in response to determining that the third string ends with a second word delimiter, outputting, by the computing device and for display at the display device, the fourth string in place of the second and third strings.

7. The method of claim 1, wherein:
determining the fourth string comprises determining, by the computing device and based on the first and second series of one or more user inputs, a plurality of replacement candidates, the plurality of replacement candidates including the fourth string; and the method further comprises determining, by the computing device, that the fourth string has a lowest replacement score among the plurality of replacement candidates.

8. The method of claim 1, wherein the first series of one or more user inputs comprises a series of one or more tapping gestures at a presence-sensitive display.

9. The method of claim 1, wherein the first series of one or more user inputs comprises a sliding movement of an input object at a presence-sensitive display.

10. The method of claim 1, wherein:
the word delimiter is a space character,
the third string comprises a first character followed by a substring,
the fourth string comprises the first string followed by the first character, followed by the word delimiter, followed by the substring, and
the first string followed by the first character and the substring match words in the lexicon.

11. The method of claim 1, wherein:
the word delimiter is a space character,
the first string comprises a substring followed by a misplaced character,
the fourth string comprises the substring, followed by the word delimiter, followed by the misplaced character, followed by the third string, and
the substring and the misplaced character followed by the third string match words in the lexicon.

12. The method of claim 1, wherein the fourth string matches a word in the lexicon and the fourth string matches the first string followed by an alphanumeric character followed by the third string.

13. The method of claim 1, wherein the fourth string matches a word in the lexicon, the word delimiter is a space character, and the fourth string matches the first string appended with the third string.

14. The method of claim 1, further comprising using, by the computing device, a finite state transducer (FST) to determine that the second series of one or more user inputs corresponds to the third string.

15. The method of claim 14, wherein using the FST comprises determining, by the computing device and based at least in part on cost values of tokens in an active beam, a highest-ranked token in the active beam, wherein the highest-ranked token in the active beam specifies the third string, wherein each of the tokens in the active beam is associated with a node in the FST.

16. The method of claim 15, wherein a particular token in the active beam is associated with a particular node of the FST and the fourth string includes a word that is associated with a terminal node of the FST that is reachable from the particular node.

17. The method of claim 1, wherein:
the method further comprises determining, by the computing device and based on the first series of one or more user inputs, a plurality of replacement candidates; and
outputting the second string in place of the first string comprises outputting, by the computing device, for display at the display device, and based at least in part on a comparison of a replacement score of the second string and a threshold, the second string in place of the first string.

18. A computing device that comprises one or more processors configured to:
receive a first series of one or more user inputs;

in response to determining that the first series of one or more user inputs corresponds to a first string of characters, output, for display at the display device, the first string of characters;

in response to determining that the first string does not match a word in a lexicon and in response to determining that the first string ends with a word delimiter, output, for display at the display device, a second string of characters in place of the first string of characters;

after receiving the first series of one or more user inputs, receive a second series of one or more user inputs;

in response to determining that the second series of one or more user inputs corresponds to a third string, output, for display at the display device, the third string;

determine, based at least in part on the first and second series of one or more user inputs, a fourth string of characters; and output, for display at the display device, the fourth string of characters in place of the second and third strings.

19. The computing device of claim 18, wherein the one or more processors are configured to:

output, for display at the display device, a suggestion element that contains the fourth string of characters; and in response to receiving an indication of a user input to select the suggestion element, output, for display at the display device, the fourth string of characters in place of the second and third strings of characters.

20. A non-transitory computer-readable storage medium that stores instructions that, when executed by one or more processors of a computing device, cause the computing device to:

in response to determining that a first series of one or more user inputs corresponds to a first string of characters, output, for display at a display device, the first string of characters;

in response to determining that the first string of characters does not match a word in a lexicon and in response to determining that the first string of characters ends with a word delimiter, output, for display at the display device, a second string of characters in place of the first string of characters;

in response to determining that a second series of one or more user inputs received after the first series of one or more user inputs corresponds to a third string of characters, output, for display at the display device, the third string of characters;

determine, based at least in part on the first and second series of one or more user inputs, a fourth string of characters; and output, for display at the display device, the fourth string in place of the second and third strings of characters.

\* \* \* \* \*